United States Patent [19]
Ejiri et al.

[11] Patent Number: 5,994,862
[45] Date of Patent: Nov. 30, 1999

[54] AUTOMATIC WIRING CONNECTION APPARATUS

[75] Inventors: Arata Ejiri; Ichiro Watanabe; Tsugito Maruyama, all of Kawasaki, Japan

[73] Assignee: Fujitsu Limited, Kawasaki, Japan

[21] Appl. No.: 09/086,959

[22] Filed: May 29, 1998

[30] Foreign Application Priority Data

Dec. 2, 1997 [JP] Japan .................................. 9-331993

[51] Int. Cl.[6] ...................................................... B25J 5/00
[52] U.S. Cl. ............... 318/568.12; 318/560; 318/568.16; 318/569; 901/10; 901/46; 901/41
[58] Field of Search .............................. 318/568.12, 560, 318/568.16, 569; 901/10, 46, 41; 385/17

[56] References Cited

U.S. PATENT DOCUMENTS 5,581,644  12/1996  Saito et al. .................................. 385/17
5,661,826  8/1997  Saito et al. .................................. 385/17

FOREIGN PATENT DOCUMENTS 1-260994  10/1989  Japan .
3-50608  3/1991  Japan .

*Primary Examiner*—Karen Masih
*Attorney, Agent, or Firm*—Staas & Halsey

[57] ABSTRACT

In an automatic wiring connection apparatus, position detection marks 221; 231 are disposed on matrix boards 220; 230, respectively, as shown in FIG. 8. Position data of a desired crosspoint hole included in anyone of areas 227_1, . . . , 227_5; 237_1, . . . , 237_4 as assembly of crosspoint holes is corrected in accordance with a difference between design values of the position detection marks 221; 231 and measured values. A pin insertion and pulling out robot is operated in accordance with the corrected position data.

18 Claims, 15 Drawing Sheets

AUTOMATIC WIRING CONNECTION APPARATUS

BACKGROUND OF THE INVENTION

1. Field of the Invention

The present invention relates to an automatic wiring connection apparatus, which is addressed as a main distribution frame (MDF), for determining a connection relation between a cable of telephone subscribers and a cable of telephone exchanges.

2. Description of the Related Art

Hitherto, the above-mentioned automatic wiring connection apparatus is widely used. In such a type of automatic wiring connection apparatus, there is adopted the following scheme of one.

FIG. 1 is a diagram useful for understanding a functional effect of an automatic wiring connection apparatus. FIG. 2 is a typical illustration showing part of wirings and crosspoint holes on a matrix board. FIG. 3 is a sectional view of a connection pin in the state that it has been inserted into a crosspoint hole.

The automatic wiring connection apparatus has a so-called matrix board (MTB). On the front side and the back side of the matrix board, there are formed wirings 11 (in FIG. 2, there is shown part of wirings in the horizontal direction) in the vertical direction and the horizontal direction. And on each of the intersections of the wirings in the vertical direction and the horizontal direction, there is formed a crosspoint hole 12. A land 13 going to the wiring 11 is formed on the periphery of each of the crosspoint holes 12.

In this automatic wiring connection apparatus, the adjacent two wires pair, and a connection pin 14 shown in FIG. 3 is inserted into two crosspoint holes 12 which are adjacent to each other at a slant, so that a connection relation between the wiring in the vertical direction and the wiring in the horizontal direction is determined. In this manner, as shown in FIG. 1, for example, a cable of a subscriber C is connected to the third cable of a telephone exchange. When an application of a new subscriber arises, a connection pin is inserted into the associated crosspoint hole. When applications of a seceder or a remover to another area arise, a connection pin is pull out from the associated crosspoint hole. According to this automatic wiring connection apparatus, an access to crosspoint holes of the matrix board in insertion and pulling out of the connection pin is automatically performed in accordance with an external instruction.

There is known a matrix board having crosspoint holes each being about 0.5 mm across in which many such crosspoint holes are arranged at intervals of about 1.6 mm, as shown in FIG. 2. There is a need to surely insert a connection pin into a desired crosspoint hole, or to properly pull out the connection pin from the crosspoint hole.

In order to insert and pull out the connection pin, a robot mechanism is adopted. In this case, there is a need to provide a precise positioning to properly access to the desired crosspoint hole. The earlier technology copes with the precise positioning by means of enhancing a precision and a rigidity of the robot. However, recently, in view of the requirement of miniaturization and low cost for the robot mechanism, there is a tendency that the robot mechanism is lowered in a precision and a rigidity. Further, the matrix board is also associated with unevenness through manufacturing. Thus, the crosspoint holes are not always located at the position as designed, and rather usually involved in positional deviation somewhat. In addition, recently, as mentioned above, diameters of the crosspoint holes and intervals of the crosspoint holes are fined. Thus, even if only the robot mechanism is enhanced in precision, it is difficult to expect a precise positioning.

For the reasons as mentioned above, according to the earlier technology, a swell and driving errors of a robot, including positional deviation of crosspoint holes on the matrix board, are manually measured on an off-line at the time of manufacturing so as to obtain data, and the data thus obtained are used in the form of a correction function thereby contributing to an improvement in precision of the final positioning of the robot.

However, according to the scheme as mentioned above, workers are needed. This causes the cost to increase. Further, after the apparatus is installed, it is impossible to alter the data. Thus, it is difficult to readily cope with the change in the state of assembly due to the secular change and the disturbance such as an earthquake.

In order to solve the foregoing inconvenience, there has been proposed the use of a 4-division sensor for detecting positions of crosspoint holes on the matrix board (Japanese Patent Application Laid Open Gazette Hei.3-50608).

FIG. 4 is a typical illustration of a 4-division sensor.

A 4-division sensor 20 has four divided sensor areas 21, 22, 23 and 24 and is able to independently detect light volumes $V_a$, $V_b$, $V_c$ and $V_d$ which are incident upon the sensor areas 21, 22, 23 and 24, respectively. Positioning is made at the point in which anyone of a difference between light volumes $(V_b+V_c)-(V_a+V_d)$ in a Y-direction and a difference between light volumes $(V_c+V_d)-(V_a+V_b)$ in a Z-direction becomes zero.

FIG. 5 is a typical illustration of errors in perforation position of crosspoint holes.

In the event that a crosspoint hole is detected by the 4-division sensor, there is provided such a control that the crosspoint hole is irradiated with light and the 4-division sensor is translated toward a position in which light volume of the reflected light from the crosspoint hole balances in both the Y-direction and the Z-direction. Exactly, the crosspoint hole per se is an opening and thus no reflected light from the crosspoint hole exists. Accordingly, actually, the reflected light from the land of the vicinities of the crosspoint hole is detected. However, generally, a formation of the wires and the lands, and a perforation of the crosspoint holes are different from one another in a manufacturing process. Thus, a positional relation between the crosspoint hole and the land is not always a positional relation as designed, such as a positional relation between the crosspoint hole 12a and the land 13a shown in FIG. 5, and it happens that as in the crosspoint hole 12b of the center of FIG. 5 the crosspoint hole is located near the corner of the land 13b, or alternatively it happens that as in the crosspoint hole 12c of the right of FIG. 5 the crosspoint hole is partially out of the land 13c. In those cases, the light volume does not balance properly in the use of the 4-division sensor. Thus, it is impossible to expect a proper detection.

On the other hand, when it is intended that a matrix board, which is proper in a positional relation between a crosspoint hole and a land, is produced, this would involve a big raise in cost. It may be considered that even if a position of a crosspoint hole is deviated, an area of a land is extended so that the crosspoint hole is always accommodated in the land. In this case, however, there is a need to expand a pitch between crosspoint holes and a wiring interval. Thus, this is contrary to a requirement of miniaturization of the apparatus.

Further, there is a proposal (Japanese Patent Application Laid Open Gazette Hei.1-260994) that a hole as a position detection mark is provided in association with the respective crosspoint hole, but a crosspoint hole is not directly detected. In the event that marks (holes) are provided other than the crosspoint holes, it is possible to provide a mark (hole) suitable for a sensor, and thus it is advantageous for a positional detection. However, this involves a need to provide a pair of the position detection mark and the crosspoint hole, and thus it is difficult to enhance an integration degree of crosspoint holes on a matrix board.

SUMMARY OF THE INVENTION

In view of the foregoing, it is therefore an object of the present invention to provide an automatic wiring connection apparatus capable of doing over again a correction as required after an installation, and also having less bad effect on an integration degree of crosspoint holes on a matrix board.

To achieve the above-mentioned object, according to the present invention, there is provided a first automatic wiring connection apparatus comprising:

a matrix board, in which a plurality of crosspoint holes are arranged on a two-dimensional basis in a predetermined arrangement pitch, for forming signal paths according to insertion and pulling out of connection pins with respect to the plurality of crosspoint holes;

a pin insertion and pulling out head having charge of insertion and pulling out of connection pins with respect to the plurality of crosspoint holes of said matrix board; and a pin insertion and pulling out robot having a head translation mechanism for translating said pin insertion and pulling out head on a two-dimensional basis along a surface of said matrix board;

wherein said matrix board has a calibration track in which a plurality of position detection marks are arranged in each of two directions mutually intersecting, and said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for the position detection marks, and additional position data representative of a translation position of said pin insertion and pulling out head by said head translation mechanism when the position detection marks are detected by said sensor.

In the first automatic wiring connection apparatus as mentioned above, the matrix board has the calibration track on each of the two directions (for example, the vertical direction and the horizontal direction).

According to the first automatic wiring connection apparatus, the calibration track, in which position detection marks are arranged, is provided for example, typically, in each of the vertical direction and the horizontal direction, and the position arithmetic unit determines position data for translating the pin insertion and pulling out head to a desired crosspoint hole in accordance with position data on design for the position detection marks arranged on the calibration tracks, and additional position data representative of a translation position of the pin insertion and pulling out head by the head translation mechanism when the position detection marks are detected by the sensor. It is sufficient that only the single calibration track is provided, typically, in each of the vertical direction and the horizontal direction, and with respect to the pitches for the position detection marks constituting the calibration track, more rough pitches can be used as compared with the arrangement pitches of the crosspoint holes. Thus, it is possible to implement a positioning with great accuracy without having a great effect on a degree of the integration of the crosspoint holes. In case of positioning adopting the calibration track, the head translation mechanism can correct the positional deviation due to a swell (a variation in a right angle direction with respect to the drive direction) of the pin insertion and pulling out head and a driving error (a variation in a driving amount in the drive direction).

It is acceptable that the position detection mark consists of, similar to the crosspoint hole, a hole provided at the center and a land surrounding the hole. The land has such a size that the hole for the position detection mark does not go beyond the land. As the sensor, typically, a 4-divison sensor can be used.

To achieve the above-mentioned object, according to the present invention, there is provided a second automatic wiring connection apparatus comprising:

a matrix board, in which a plurality of crosspoint holes are arranged on a two-dimensional basis in a predetermined arrangement pitch, for forming signal paths according to insertion and pulling out of connection pins with respect to the plurality of crosspoint holes;

a pin insertion and pulling out head having charge of insertion and pulling out of connection pins with respect to the plurality of crosspoint holes of said matrix board; and a pin insertion and pulling out robot having a head translation mechanism for translating said pin insertion and pulling out head on a two-dimensional basis along a surface of said matrix board;

wherein said matrix board has a plurality of areas mutually separated with breaks in an arrangement of the crosspoint holes, and has a plurality of position detection marks which are arranged at positions surrounding with at least 4 points on each of the plurality of areas, and said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for position detection marks not less than 4 points surrounding an area including the desired crosspoint hole on said matrix board, and additional position data representative of a translation position of said pin insertion and pulling out head by said head translation mechanism when the position detection marks not less than 4 points are detected by said sensor.

With respect to the matrix board, usually, the areas in which the crosspoint holes are arranged are separated as an island. That is, there are provided a plurality of areas mutually separated through brakes in an arrangement of the crosspoint holes. Thus, according to the second automatic wiring connection apparatus, the matrix board has a plurality of areas mutually separated with breaks in an arrangement of the crosspoint holes, and has a plurality of position detection marks which are arranged at positions surrounding with at least 4 points on each of the plurality of areas, and the pin insertion and pulling out robot has a sensor adapted for moving in united body together with the pin insertion and pulling out head to detect the position detection marks, and a position arithmetic unit for determining position data for translating the pin insertion and pulling out head to a desired crosspoint hole in accordance with position data on design for position detection marks not less than 4 points surrounding an area including the desired crosspoint hole on said matrix board, and additional position data representative of a translation position of the pin insertion and pulling out head by said head translation mechanism when the position detection marks not less than 4 points are detected by the sensor. This feature permits the use of 4 points of position detection marks for each area on the matrix board, and in addition makes it possible to use parts of the position detection marks in the adjacent areas on a common basis. Thus, positioning of the crosspoint holes by the use of a small number of position detection marks makes it possible to implement a positioning with great accuracy without having a great effect on a degree of the integration of the crosspoint holes of the matrix board.

According to the correction using the 4 points of position detection marks surrounding the periphery, it is possible to correct the positional deviation due to the distortion of the matrix board, for example, in the event that one side of the matrix board expands and contracts with respect to the associated opposite side, and a square or rectangle of area is distorted into a trapezoid-configuration.

In a similar fashion to that of the first automatic wiring connection apparatus, it is acceptable that the position detection mark consists of a hole provided at the center and a land surrounding the hole. As the sensor, typically, a 4-divison sensor can be used.

To achieve the above-mentioned object, according to the present invention, there is provided a third automatic wiring connection apparatus, which is a complex of the first automatic wiring connection apparatus and the second automatic wiring connection apparatus, comprising:

a matrix board, in which a plurality of crosspoint holes are arranged on a two-dimensional basis in a predetermined arrangement pitch, for forming signal paths according to insertion and pulling out of connection pins with respect to the plurality of crosspoint holes;

a pin insertion and pulling out head having charge of insertion and pulling out of connection pins with respect to the plurality of crosspoint holes of said matrix board; and a pin insertion and pulling out robot having a head translation mechanism for translating said pin insertion and pulling out head on a two-dimensional basis along a surface of said matrix board;

wherein said matrix board has a plurality of areas mutually separated with breaks in an arrangement of the crosspoint holes, said matrix board has a calibration track in which a plurality of position detection marks are arranged in each of two directions mutually intersecting, and has a plurality of position detection marks which are arranged at positions surrounding with at least 4 points on each of the plurality of areas, and said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for the position detection marks, and additional position data representative of a translation position of said pin insertion and pulling out head by said head translation mechanism when the position detection marks are detected by said sensor, and in addition in accordance with position data on design for position detection marks not less than 4 points surrounding an area including the desired crosspoint hole on said matrix board, and additional position data representative of a translation position of said pin insertion and pulling out head by said head translation mechanism when the position detection marks not less than 4 points are detected by said sensor.

According to the third automatic wiring connection apparatus, it is possible to correct on a synthetic basis a positional deviation due to a swell caused by a translation of the pin insertion and pulling out head by the head translation mechanism and a driving error, and also a positional deviation due to a distortion of the matrix board, and thereby performing a positioning with greater accuracy.

In the third automatic wiring connection apparatus according to the present invention, it is preferable that a part of the plurality of position detection marks constituting said calibration track of said matrix board serves as a part of the plurality of position detection marks arranged at positions surrounding with at least 4 points on each of the plurality of areas.

This feature makes it possible to contribute to reduction of the number of position detection marks, and thereby reducing a probability having even little bad effect on a degree of the integration of the crosspoint holes of the matrix board.

Also in the third automatic wiring connection apparatus according to the present invention, the matrix board has the calibration track on each of the two directions (for example, the vertical direction and the horizontal direction). Further, in a similar fashion to that of the first and second automatic wiring connection apparatus according to the present invention, it is acceptable that each of said plurality of position detection marks consists of a hole provided on a center, and a land surrounding the hole, and it is preferable that said sensor is a 4-division sensor.

To achieve the above-mentioned object, according to the present invention, there is provided a fourth automatic wiring connection apparatus comprising:

a matrix board, in which a plurality of crosspoint holes are arranged on a two-dimensional basis in a predetermined arrangement pitch, for forming signal paths according to insertion and pulling out of connection pins with respect to the plurality of crosspoint holes;

a pin insertion and pulling out head having charge of insertion and pulling out of connection pins with respect to the plurality of crosspoint holes of said matrix board; and a pin insertion and pulling out robot having a head translation mechanism for translating said pin insertion and pulling out head on a two-dimensional basis along a surface of said matrix board;

wherein said matrix board has a predetermined position detection mark and a land mark having an area larger than the position detection mark and also having a wedge-like configuration of tip portion, a relative position of the tip portion of the land mark being known with respect to the position detection mark, said pin insertion and pulling out robot has a sensor adapted for moving in united body together with said pin insertion and pulling out head to detect the position detection mark, and a head translation control unit for controlling said head translation mechanism in such a manner that said sensor is disposed on the land mark, said sensor disposed on the land mark is moved to the tip portion, and the sensor translated to the tip portion is moved to the position detection mark.

The position detection mark is a small mark consisting of, for example, a hole having the same diameter as the crosspoint hole and a land which is somewhat broader than the land of the periphery of the crosspoint hole, contributing to an improvement of precision of the position detection. This mark can be only detected by a sensor, when the sensor is translated to the vicinity of the mark. Consequently, it is problem how the sensor is translated to the vicinity of the mark to be detected. This is indispensable to a high precision of positioning. A relative position of a plurality of position detection marks on the matrix board is known beforehand while including positional errors in some extent. Therefore, in case of the structure that a sensor is always disposed on one matrix board, it is usually possible to translate the sensor to the vicinity of a desired position detection mark. However, the foregoing problem arises, for example, in the event that a positional relation between the sensor and the position detection mark is out of the limit of detectable range by any courses such as an earthquake, or shock, alternatively, in the event that one robot for a pin insertion and pulling out takes charge of a plurality of matrix boards, and a pin insertion and pulling out head moves beyond the limits of one matrix board.

According to the fourth automatic wiring connection apparatus of the present invention, the matrix board has a predetermined position detection mark and a land mark having an area larger than the position detection mark. The land mark has a large area in such an extent that when a considerable big positional deviation arises, such a positional deviation can be absorbed. First, a 4-division sensor is translated onto the land mark, and then the sensor is translated to the tip portion. An algorithm for translation of the sensor to the tip portion is not restricted to the specific algorithm, and it is acceptable that the sensor is translated to the tip portion by means of for example, the periphery of the land mark being traced by the sensor or, alternatively, as will be described later, it is acceptable that the sensor is translated to the tip portion in such a manner that a 4-division sensor is used and a bias such that a balance of the 4-division sensor is lost is applied. Since a relative position of the tip portion of the land mark is being known with respect to the position detection mark, the sensor (the pin insertion and pulling out head), which is translated to the tip portion, can be translated to the position detection mark.

To achieve the above-mentioned object, according to the present invention, there is provided a fifth automatic wiring connection apparatus comprising:

a matrix board having crosspoint holes each perforated on a land, said matrix board having position detection holes each having a land larger than the crosspoint holes; and a sensor for detecting the position detection hole, wherein positions of the crosspoint holes are determined in accordance with a position of the position detection hole detected by said sensor.

In the fifth automatic wiring connection apparatus of the present invention, it is preferable that a plurality of said position detection holes are arranged in two directions mutually intersecting to form a calibration track, said apparatus has a head translation mechanism for moving said sensor, positions of the position detection holes of said calibration track are detected by said sensor while being moved, and said apparatus has a position arithmetic unit for determining position data for positioning to crosspoint holes by said head translation mechanism in accordance with the detected position.

In this case, it is acceptable that the position arithmetic unit corrects mechanical errors of said head translation mechanism.

Further, in the fifth automatic wiring connection apparatus of the present invention, it is preferable that said crosspoint holes are arranged in form of a square to define a crosspoint area, said position detection holes are formed at positions surrounding the crosspoint area, said apparatus has a head translation mechanism for moving said sensor, positions of the position detection holes are detected by said sensor while being moved, and said apparatus has a position arithmetic unit for determining position data for positioning to crosspoint holes by said head translation mechanism in accordance with the detected position.

In this case, it is acceptable that said position arithmetic unit corrects a slant of said head translation mechanism with respect to the crosspoint area.

DESCRIPTION OF THE PREFERRED EMBODIMENTS

Hereinafter, there will be described embodiments of the present invention.

Figure 6:
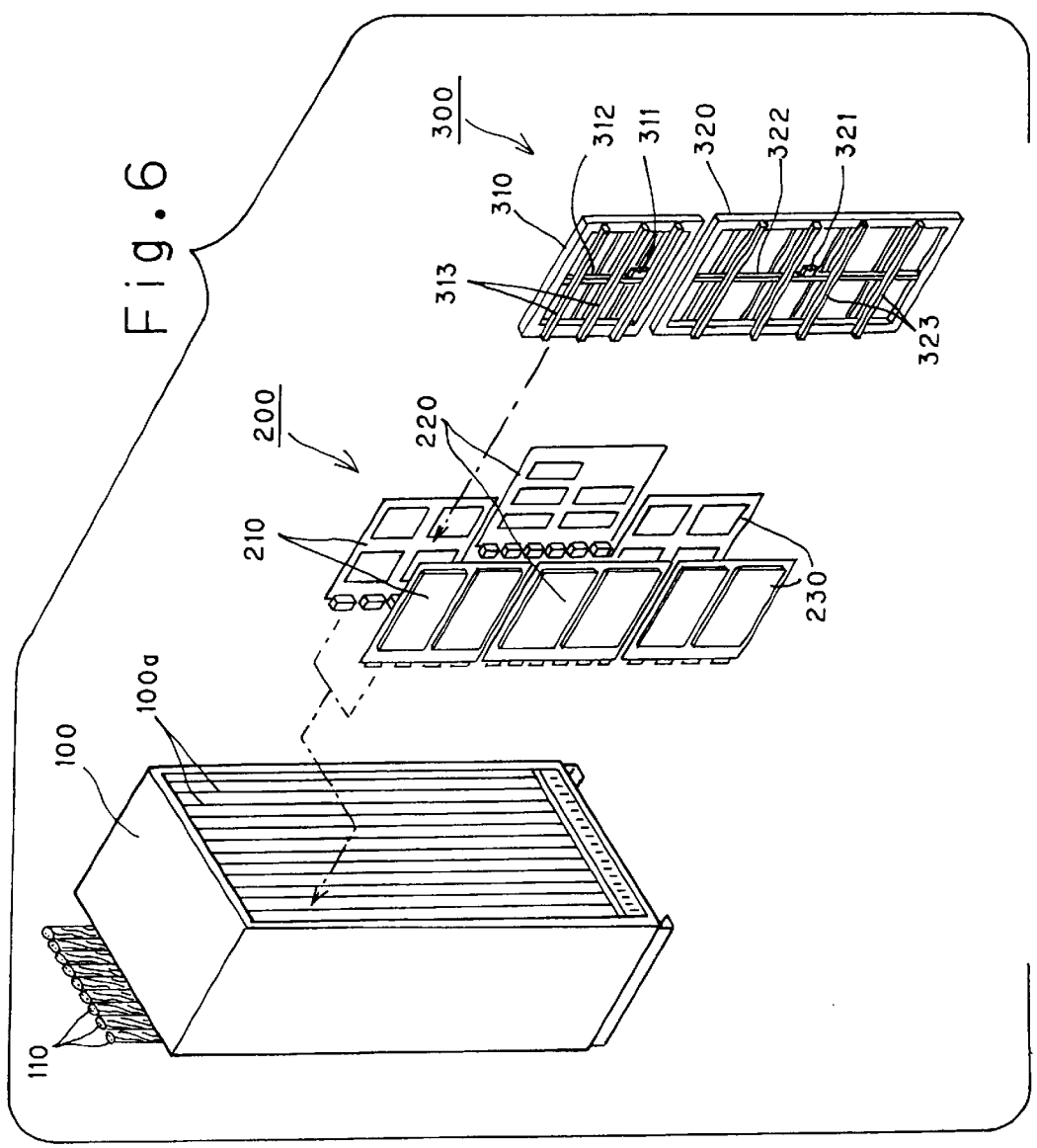
FIG. 6 is an exploded perspective illustration of an automatic wiring connection apparatus according to an embodiment of the present invention.

FIG. 6 is an exploded perspective illustration of an automatic wiring connection apparatus according to an embodiment of the present invention.

A large number of telephone lines 110 are wired near a cover member 100 which is partitioned into a plurality of small chambers by partition plates 100a. Each of the small chambers stores therein a matrix board (MTB) 200 and a pin insertion and pulling out robot 300. In FIG. 6, however, in order for simplification, there are shown only the matrix board (MTB) 200 and the pin insertion and pulling out robot 300, which are accommodated in one small chamber.

The matrix board (MTB) 200 comprises a primary MTB 210, a secondary MTB 220 and a tertiary MTB 230, each of which consists of a pair of boards arranged in parallel to each other.

The pin insertion and pulling out robot 300 comprises a primary MTB-oriented robot 310, and a secondary and ternary MTB-oriented robot 320. The primary MTB-oriented robot 310 is arranged between two boards constituting the primary MTB 210, and takes charge of insertion and pulling out of connection pins on the two boards constituting the primary MTB 210. The secondary and tertiary MTB-oriented robot 320 is arranged between two boards constituting the secondary MTB 220 and also between two boards constituting the tertiary MTB 230, and takes charge of insertion and pulling out of connection pins on a total 4 boards of the two boards constituting the secondary MTB 220 and the two boards constituting the tertiary MTB 230. The primary MTB-oriented robot 310 and the secondary and ternary MTB-oriented robot 320 have pin insertion and pulling out heads 311 and 321, respectively. The pin insertion and pulling out heads 311 and 321 are vertically translated along vertical guides 312 and 322, respectively, and the vertical guides 312 and 322 are horizontally translated by horizontal guides 313 and 323, respectively, so that the pin insertion and pulling out heads 311 and 321 are translated on a two-dimensional basis along surfaces of the primary MTB 210; and the secondary MTB 220 and the tertiary MTB 230, respectively, to perform access to the primary MTB 210; and the secondary MTB 220 and the tertiary MTB 230 in connection with insertion and pulling out of connection pins.

In the automatic wiring connection apparatus shown in FIG. 6, each of the small chambers partitioned by partition plates 100a is provided with a pair of the matrix board (MTB) 200 and the pin insertion and pulling out robot 300.

Figure 7:
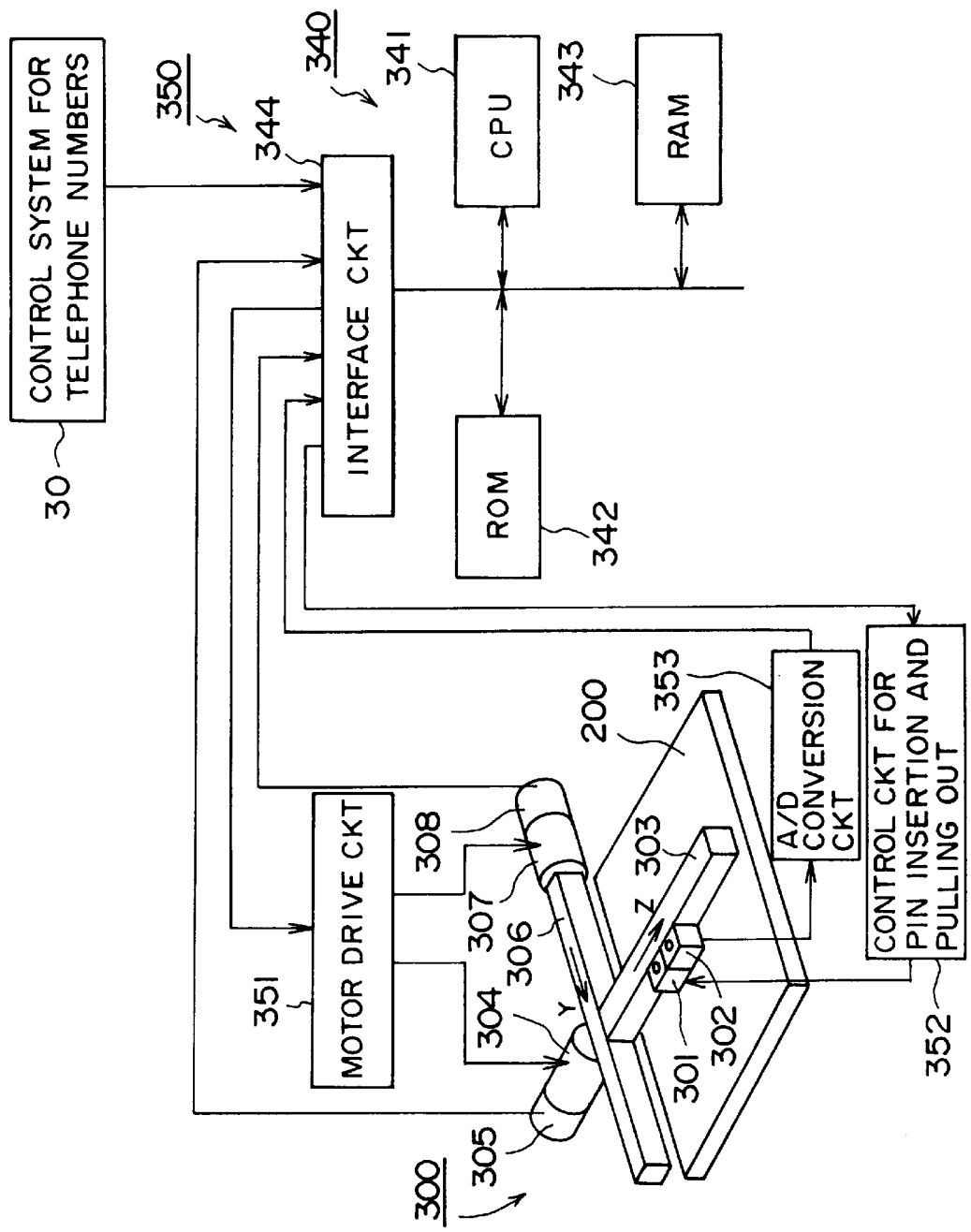
FIG. 7 is a typical illustration of a robot for insertion and pulling out of pins.

FIG. 7 is a typical illustration of a robot for insertion and pulling out of pins. The robot shown in FIG. 7 corresponds to one of the two robots 310 and 320 constituting the pin insertion and pulling out robot 300 shown in FIG. 6. Here, for the purpose of the explanation of the principle of the robot for insertion and pulling out of pins, the robot shown in FIG. 7 is simplified.

The pin insertion and pulling out robot 300 is disposed in the vicinity of a surface of the MTB 200, and comprises a pin insertion and pulling out head 301 for accessing to the MTB 200 in connection with insertion and pulling out of connection pins, a guide rod 303 for guiding the pin insertion and pulling out head 301 in a Z-direction, and a motor 304 for moving the pin insertion and pulling out head 301 along the guide rod 303. Fixed on the pin insertion and pulling out head 301 is a sensor block 302 having a 4-division sensor for detecting a position detection mark which will be described later. The sensor block 302 moves as the pin insertion and pulling out head 301 moves. Hereinafter, unless it is noted, the pin insertion and pulling out head 301 includes the sensor block 302 and it happens that the pin insertion and pulling out head 301 represents their combination making no distinction therebetween.

The motor 304 is provided with a rotation sensor 305 for measuring an amount of rotation of the motor. The use of the rotation sensor 305 makes it possible to evaluate a translated position of the pin insertion and pulling out head 301 in the Z-direction.

The pin insertion and pulling out head 301 (including the sensor block 302), the guide rod 303 and the motor 304 (including the rotation sensor 305) are supported by an additional guide rod 306 extending in a Y-direction in such a manner that they are movable in the Y-direction, and are moved in the Y-direction when an additional motor 307 is driven. The additional motor 307 is also provided with a rotation sensor 308. The use of the rotation sensor 308 makes it possible to evaluate a translated position of the pin insertion and pulling out head 301 in the Y-direction.

The pin insertion and pulling out robot 300 further comprises a circuit unit 350 including a computer system 340. The computer system 340 comprises a CPU 341 for executing various types of programs, a ROM 342 for storing the programs to be run in the CPU 341, a RAM 343 for storing measurement data, arithmetic operational results, etc., and an interface 344 taking charge of transfer of signals between the computer system 340 and external circuits but the computer system 340. The circuit unit 350 further comprises a motor drive circuit 351 for driving the motors 304 and 307 in accordance with an instruction from the computer system 340, a pin insertion and pulling out control circuit 352 for controlling the pin insertion and pulling out head 301 for insertion and pulling out of connection pins in accordance with an instruction from the computer system 340, and an A/D conversion circuit 353 for converting light volume signals obtained through the sensor block 302 into digital data to transfer the digital data thus obtained to the computer system 340, and in addition a wiring for transferring amounts of rotations (translated positions of the pin insertion and pulling out head in the Z-direction and the Y-direction) of the motors 304 and 307, which are obtained through the rotation sensors 305 and 308, respectively, to the computer system 340.

The computer system 340 receives information as to new subscribers and new seceders from an external telephone number control system 30, and translates the pin insertion and pulling out head 301 on the MTB 200 to a position according to the information so as to cause the pin insertion and pulling out head 301 to perform an insertion of a connection pin or a pulling out of a connection pin. To perform this work, there is a need to correct various types of positional errors so as to insert a connection pin into a proper crosspoint hole or pull out a connection pin from a proper crosspoint hole. In the computer system 340, as will be described later, a positioning arithmetic operation is performed on the basis of data generated from the rotation sensors 305 and 308 and data generated from the sensor block 302, so that the pin insertion and pulling out head 301 is translated to a position determined by the arithmetic operation.

Hence, the computer system 340 corresponds to a positional arithmetic unit referred to in the present invention, and also in conjunction with the motor drive circuit 351 and the A/D conversion circuit 353, corresponds to a head translation control unit, referred to in the present invention, for controlling a head translation mechanism consisting of the guide rods 303 and 306, the motors 304 and 307, etc.

Figure 8:
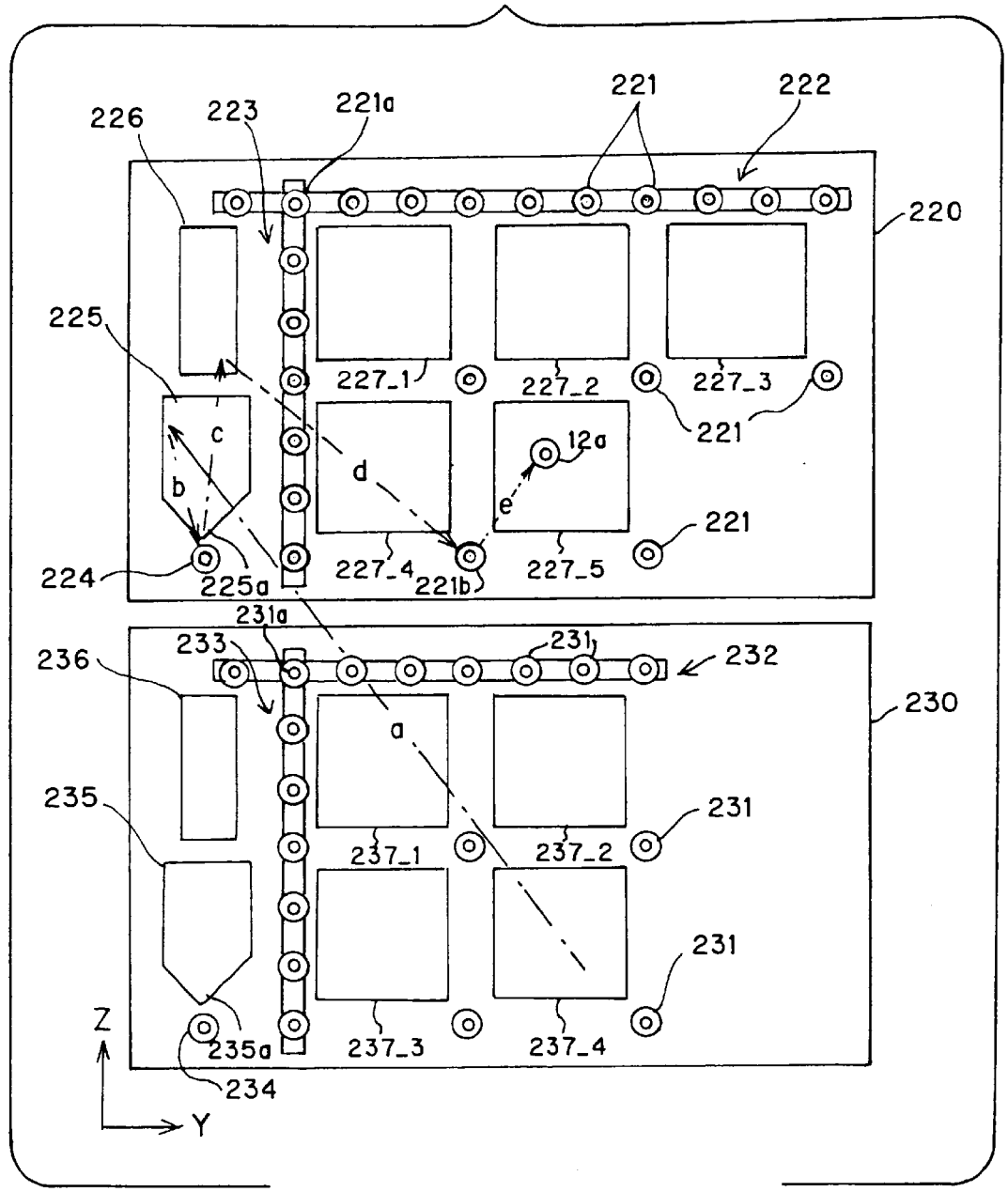
FIG. 8 is a typical illustration showing the basic arrangement of constituents of a matrix board (MTB)

FIG. 8 is a typical illustration showing the basic arrangement of constituents of a matrix board (MTB). Here, in association with the MTB 200 shown in FIG. 6, there are shown one of the two boards constituting the secondary MTB 220 and one of the two boards constituting the tertiary MTB 230. Here, those respective one boards are addressed as a secondary MTB board 220 and a tertiary MTB board 230, respectively.

The MTB board 220 comprises a horizontal calibration track 222 (hereinafter it will happen that the calibration track is addressed as CT) in which a plurality of position detection marks 221 are arranged at even intervals in a horizontal direction (Y-direction), and a vertical calibration track 223 (vertical CT) in which a plurality of position detection marks 221 are arranged at even intervals in a vertical direction, but a single position detection mark 221a is used on a common basis between the horizontal CT 222 and the vertical CT 223.

In a similar fashion to that of the MTB board 220, the tertiary MTB board 230 comprises a horizontal calibration track 232 in which a plurality of position detection marks 231 are arranged at even intervals in a horizontal direction (Y-direction), and a vertical calibration track 233 (vertical CT) in which a plurality of position detection marks 231 are arranged at even intervals in a vertical direction, but a single position detection mark 231a is used on a common basis between the horizontal CT 232 and the vertical CT 233.

Further, in the MTB board 220 there exists a plurality of areas 227_1, 227_2 . . . , 227_5 in each of which at the four corners the position detection marks 221, which are used on a common basis with the position detection marks 221 partially constituting the horizontal CT 222 and the vertical CT 223, are arranged. In a similar fashion to that of the MTB board 220, in the tertiary MTB board 230 there exists a plurality of areas 237_1, 237_2 . . . , 237_5 in each of which at the four corners the position detection marks 231, which are used on a common basis with the position detection marks 231 partially constituting the horizontal CT 232 and the vertical CT 233, are arranged. The MTB boards 220 and 230 have position detection marks (origin marks) 224 and 234 for determining the origins of the positional coordinates of the MTB boards 220 and 230, respectively, and in addition land marks 225 and 235 adjacent to the origin marks 224 and 234 and having larger areas than the origin marks 224 and 234, respectively, the land marks 225 and 235 being made of the same material as the lands 13 of the crosspoint holes 12 and the wires 11 (cf. FIG. 2). The land marks 225 and 235 have tip portions 225a and 235a narrowed toward the origin marks 224 and 234 as a wedge, respectively. The tip portions 225a; 235a and the origin marks 224; 234 are closely located to each other, respectively, and their intervals are known.

Figure 3:
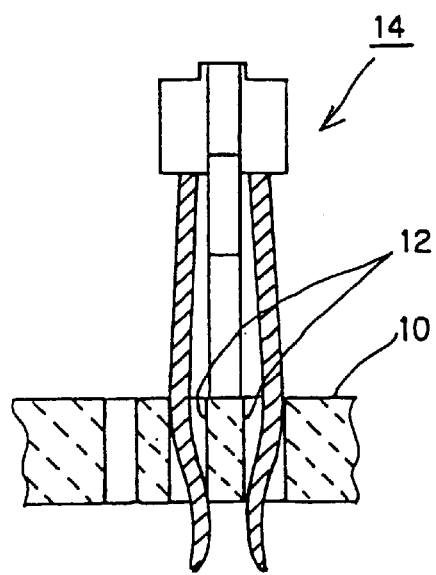
FIG. 3 is a sectional view of a connection pin in the state that it has been inserted into a crosspoint hole.
Figure 4:
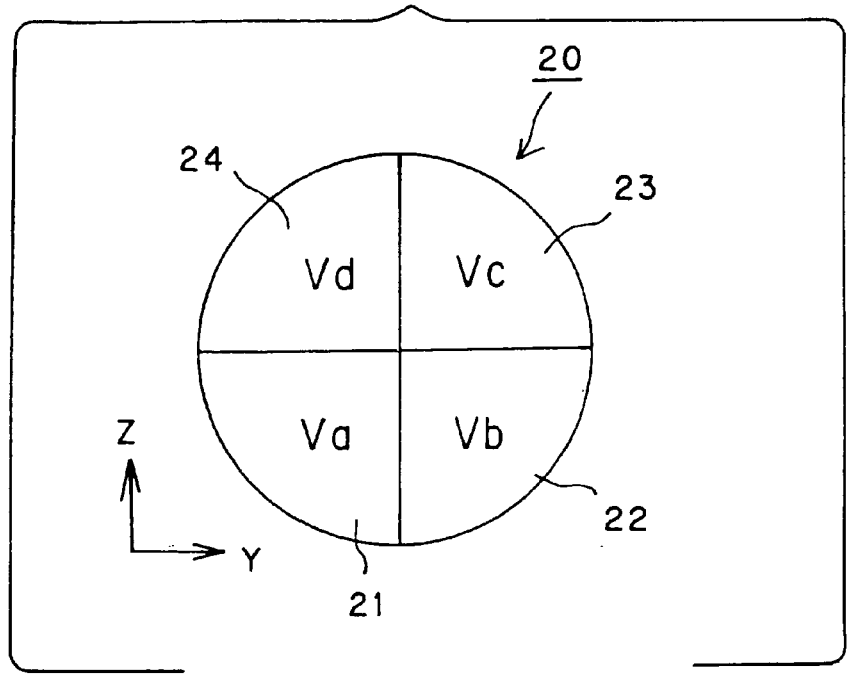
FIG. 4 is a typical illustration of a 4-division sensor.
Figure 5:
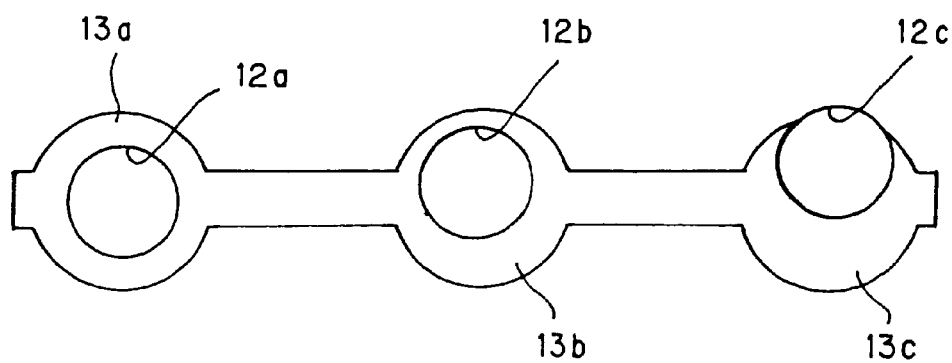
FIG. 5 is a typical illustration of errors in perforation position of crosspoint holes.

The MTB boards 220 and 230 respectively have connection pin stock areas 226 and 236 in which unused connection pins (not shown in FIG. 8, see FIG. 3) are inserted into the similar holes as the crosspoint holes.

The sensor block 302, which is provided on the pin insertion and pulling out robot 300 shown in FIG. 7, detects the position detection marks 221 periodically for example, once a day or once a week, alternatively irregularly; when the sensor block 302 is disposed at the position of the respective position detection marks 221, the translation position data of the pin insertion and pulling out head 301 are read from the rotation sensors 305 and 308; and when the pin insertion and pulling out head 301 (FIG. 7) is moved to a position of a desired crosspoint hole 12a (FIG. 8), translation position data of the crosspoint hole 12a is determined corresponding to amounts of rotation of the motors 304 and 307. The motors 304 and 307 rotate on the basis of the translation position data so that the pin insertion and pulling out head 301 is translated to a position of the crosspoint hole 12a.

Assuming that the pin insertion and pulling out head 301 is located at the tertiary MTB 230, and when it is intended that the pin insertion and pulling out head 301 is translated to the crosspoint hole 12a on the secondary MTB 220, the pin insertion and pulling out head 301 is translated to the crosspoint hole 12a through the following procedure. First, the pin insertion and pulling out head 301 is translated to the land mark 225 of the secondary MTB 220 (arrow a of FIG. 8). The land mark 225 has a considerable wide area, for example, 5 mm×5 m, so that the pin insertion and pulling out head 301 may reach the land mark 225 even if various errors are included.

After the pin insertion and pulling out head 301 has reached the land mark 225, the pin insertion and pulling out head 301 travels on the land mark 225 and goes to the tip portion 225a of the land mark 225 (arrow b of FIG. 8). A distance between the tip portion 225a and the origin mark 224 is short, and the relative positional relation therebetween is known beforehand. Thus, the pin insertion and pulling out head 301 may travel from the tip portion 225a to the origin mark 224. At that time, even if there exists somewhat of a positional deviation between the translated position of the pin insertion and pulling out head 301 and the position of the origin mark 224, such a deviation is within a limit detectable through the sensor block 302 fixed on the pin insertion and pulling out head 301, and thus it is possible to certainly grasp the origin mark 224.

The respective position detection marks 221 are measured in their position periodically or irregularly in the manner as mentioned above, so that the pin insertion and pulling out head 301 can move from the origin mark 224 to a desired position detection mark 221.

With respect to the MTB boards 220 and 230 shown in FIG. 8, typically, the MTB board 220 will be described hereinafter.

There will be explained a case where in each of the areas 227_1, 227_2 . . . , 227_5, the position detection mark 221 of the left corner of the associated area is determined as a reference point of the area, and a connection pin is inserted into the crosspoint hole 12a. The pin insertion and pulling out head, which is located at the position of the origin mark 224, once moves to take the connection pin (the arrow c), and then moves to a reference position (position detection mark) 221b of the area 227_5 including the desired crosspoint hole 12a (the arrow d). In this case, even if the pin insertion and pulling out head cannot directly reach the exact position of the reference position (position detection mark) 221b, it is an area which is sufficiently sensible for the 4-division sensor provided on the sensor block 302 (FIG. 7), and thus the pin insertion and pulling out head exactly moves to the position of the reference position (position detection mark) 221b. Thereafter, the pin insertion and pulling out head 301 moves (the arrow e) to a position indicated by translation position data of the crosspoint hole 12a determined on the basis of the arithmetic operation, which will be described later, so as to insert the connection pin into the crosspoint hole 12a. When the pin insertion and pulling out head 301 moves from the reference position 221b to the crosspoint hole 12a, it moves based on the corrected data to the position of the crosspoint hole 12a so as to insert the connection pin into the crosspoint hole 12a, without detecting the crosspoint hole 12a by the 4-division sensor or another sensor.

Figure 9:
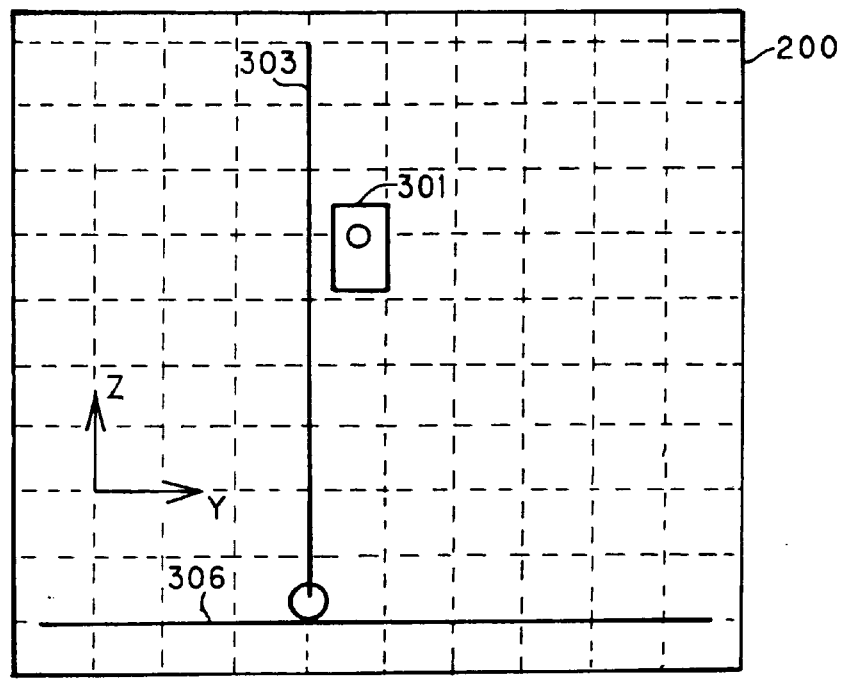
FIG. 9 is a diagram used for the explanation of the operation of a head for insertion and pulling out of pins in the ideal state.
Figure 10:
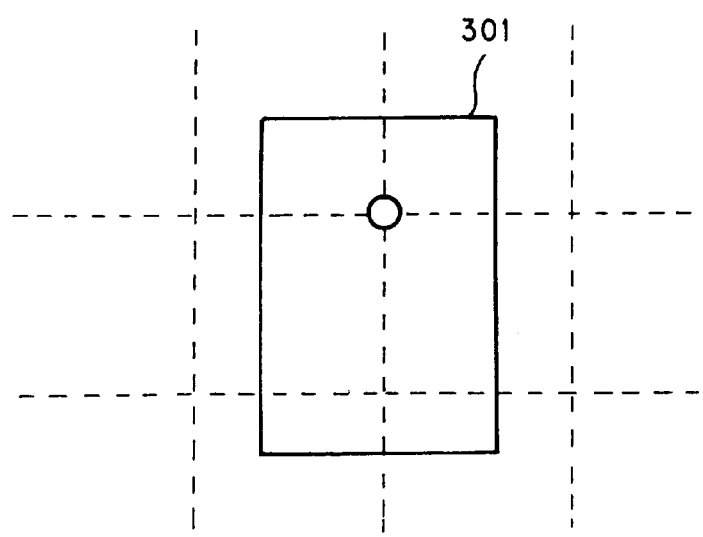
FIG. 10 is an enlarged view of the head for insertion and pulling out of pins in the ideal state.

FIG. 9 is a diagram used for the explanation of the operation of a head for insertion and pulling out of pins in the ideal state. FIG. 10 is an enlarged view of the head for insertion and pulling out of pins in the ideal state.

A guide rod 303, which is also shown in FIG. 7, extends ideally on the straight in a Z-direction, and the motor 304 (FIG. 7) serves to translate the pin insertion and pulling out head 301 on the straight in a Z-axis direction suitably in movement. Another guide rod 306 extends ideally on the straight in a Y-direction, and the motor 304 (FIG. 7) serves to translate the guide rod 303 on the straight in a Y-axis direction suitably in movement. In this case, provided that crosspoint holes are disposed at intersections of the vertical and horizontal lines shown with the broken lines in the figure, as shown in FIG. 10, the pin insertion and pulling out head 301 is properly translated to the position of the crosspoint hole.

Figure 11:
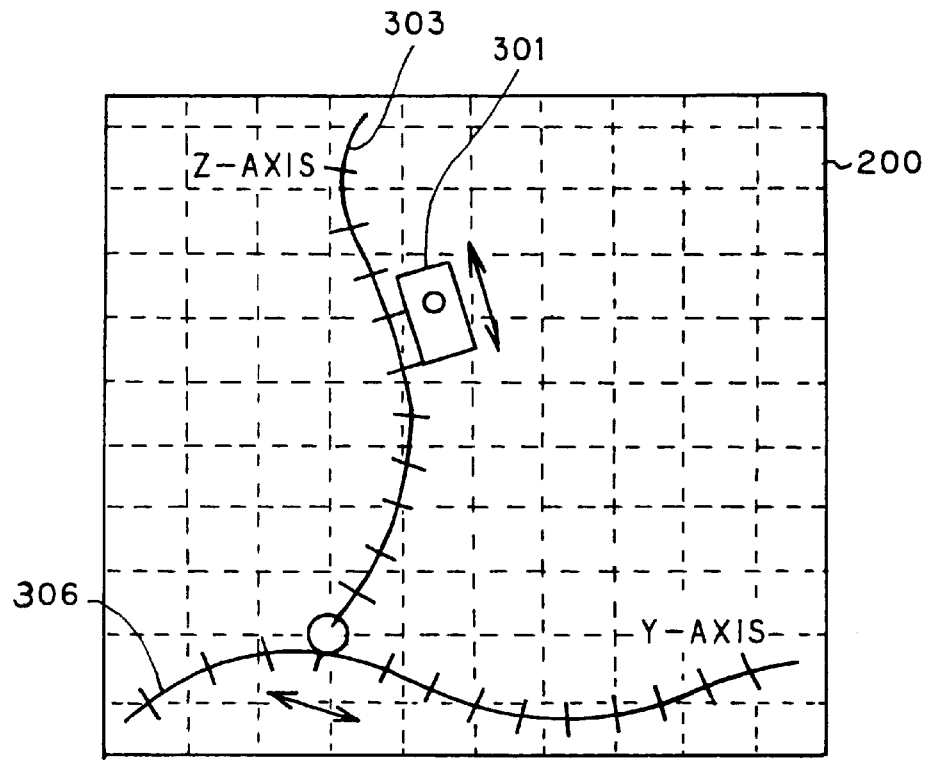
FIG. 11 is a diagram used for the explanation of the operation of a head for insertion and pulling out of pins in case of containing errors.
Figure 12:
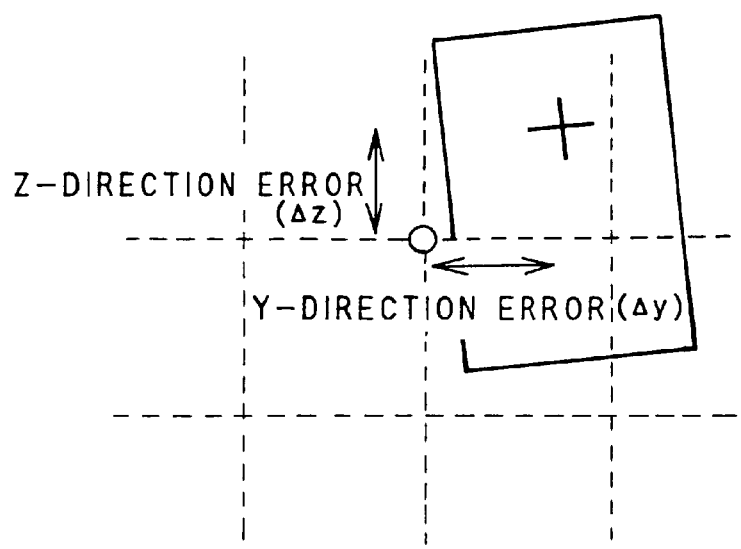
FIG. 12 is an enlarged view of the head for insertion and pulling out of pins in case of containing errors.

FIG. 11 is a diagram used for the explanation of the operation of a head for insertion and pulling out of pins in case of containing errors. FIG. 12 is an enlarged view of the head for insertion and pulling out of pins in case of containing errors.

The pin insertion and pulling out head 301 does not actually takes an ideal behavior as being explained referring to FIGS. 9 and 10. Indeed, the guide rods 303 and 306 curve as shown in FIG. 11, and movement of the pin insertion and pulling out head 301 and the guide rod 303 by the motors 304 and 307 (FIG. 7) are associated with errors. Thus, as shown in FIG. 12, when the pin insertion and pulling out head 301 is translated to the position of a desired crosspoint hole, it involves positional errors in the Y-direction and the Z-direction.

Figure 13:
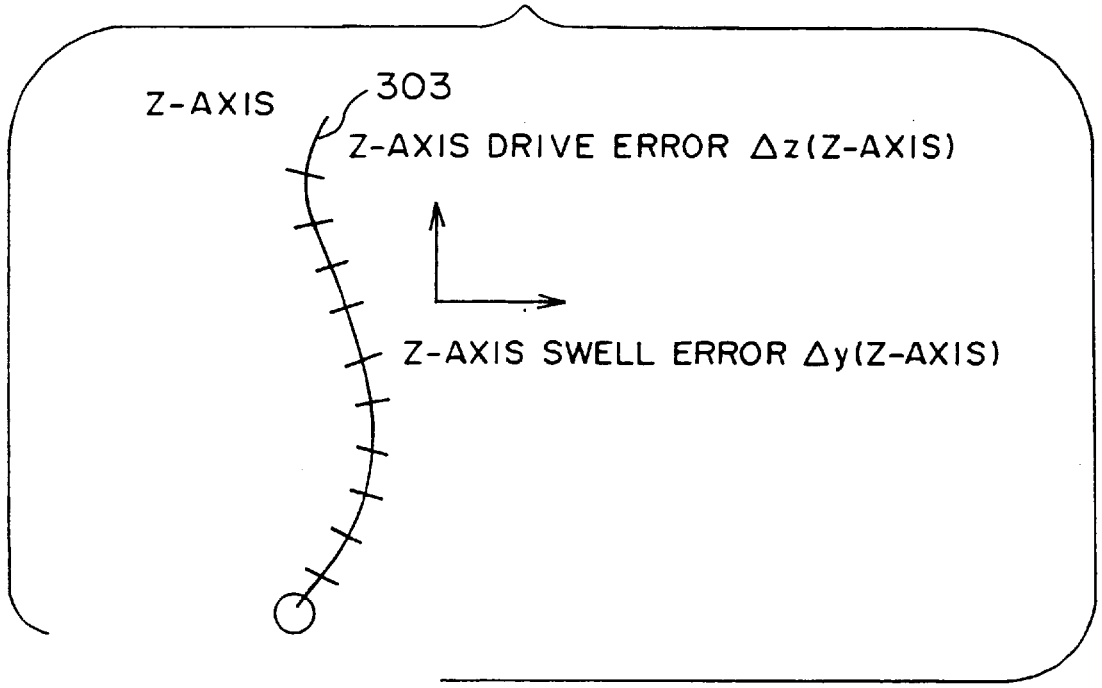
FIG. 13 is an illustration showing an error component being resolved.
Figure 14:
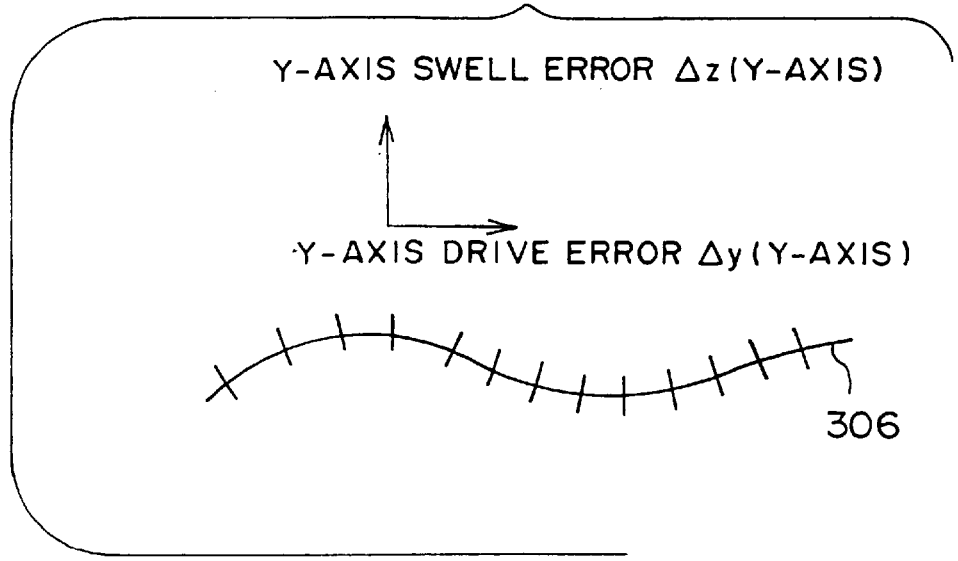
FIG. 14 is an illustration showing an error component being resolved.

FIGS. 13 and 14 are illustrations each showing an error component being resolved.

As shown in FIG. 13, when the pin insertion and pulling out head 301 is translated along the guide rod 303 extending in the Z-direction, this involves a Z-axis swell error $\Delta y$ (Z-axis) due to swells of the guide rod 303 in the Y-axis direction, and a Z-axis drive error $\Delta z$ (Z-axis) due to errors in amount of translation for the pin insertion and pulling out head 301 by the motor 304 (FIG. 7). Likewise, as shown in FIG. 14, when the guide rod 303 is translated along the guide rod 306, this involves a Y-axis swell error $\Delta z$ (Y-axis), and a Y-axis drive error $\Delta y$ (Y-axis), due to errors in amount of translation for the pin insertion and pulling out head 301 by the motor 304 (FIG. 7). The Y-direction error $\Delta y$ and the Z-direction error $\Delta z$ are expressed by $\Delta y = \Delta y$ (Y-axis) + $\Delta y$ (Z-axis)

$\Delta z = \Delta z$ (Y-axis) + $\Delta z$ (Z-axis)

Thus, the position detection marks arranged on the horizontal CT 222, 232 and the vertical CT 223, 233 shown in FIG. 8 are detected by the 4-division sensor of the sensor block 302, and the respective positions of the position detection marks are measured by the rotation sensors 305 and 308 mounted on the motors 304 and 307 shown in FIG. 7, respectively, so that a correction (addressed as a "CT correction") based on a measured result is performed. In the event that positions of position detection marks are measured, first, the pin insertion and pulling out head 301 is translated to a position of the position detection mark to be detected in accordance with a design value or the position data measured at the last time, and is translated to the exact position of the position detection mark by the 4-division sensor of the sensor block 302 to read the rotation detection values of the rotation sensors 305 and 308. This process is repeated on each position detection mark.

Figure 15:
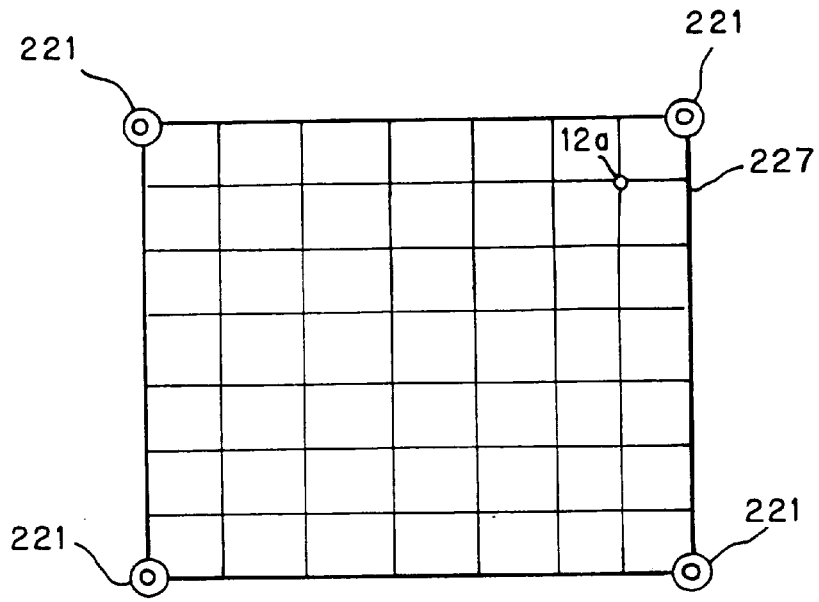
FIG. 15 is a typical illustration showing one area, in which crosspoint holes are arranged, on a matrix board (MTB) in the ideal state.
Figure 16:
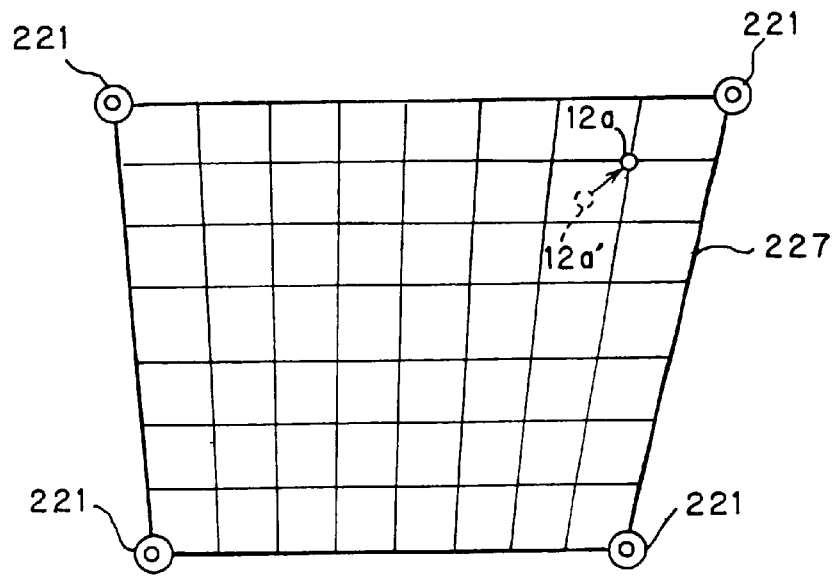
FIG. 16 is a typical illustration showing one area, which is the same as that of FIG. 15, on a matrix board (MTB) in the real state.

FIG. 15 is a typical illustration showing one area, in which crosspoint holes are arranged, on a matrix board (MTB) in the ideal state. FIG. 16 is a typical illustration showing one area, which is the same as that of FIG. 15, on a matrix board (MTB) in the real state.

At four corners of the area 227, there are arranged the position detection marks 221, respectively. The four position detection marks 221 are disposed ideally at the corners of a square or a rectangle, respectively, and the crosspoint holes are located at the intersections of the vertical and horizontal line segments shown in FIG. 15, respectively.

Actually, however, the area 227 offers a somewhat distorted configuration owing to expansion and contraction of the MTB, and as a result the crosspoint hole 12a is located at a point out of the ideal designed position. This error is corrected on the basis of a result of a position measurement of the four position detection marks 221 surrounding the area 227. Here, this correction is referred to as a "four point correction".

Incidentally, it has been explained that the errors explained referring to FIGS. 10–14 are mainly caused by the pin insertion and pulling out robot, and the errors explained referring to FIGS. 15–16 are mainly caused by the MTB. However, it is to be noted that indeed, any errors may occur owing to their combination of both the various types of causes.

Hereinafter, there will be explained first a method of detection of an origin mark using a land mark, and then the four point correction and the CT correction.

Figure 17:
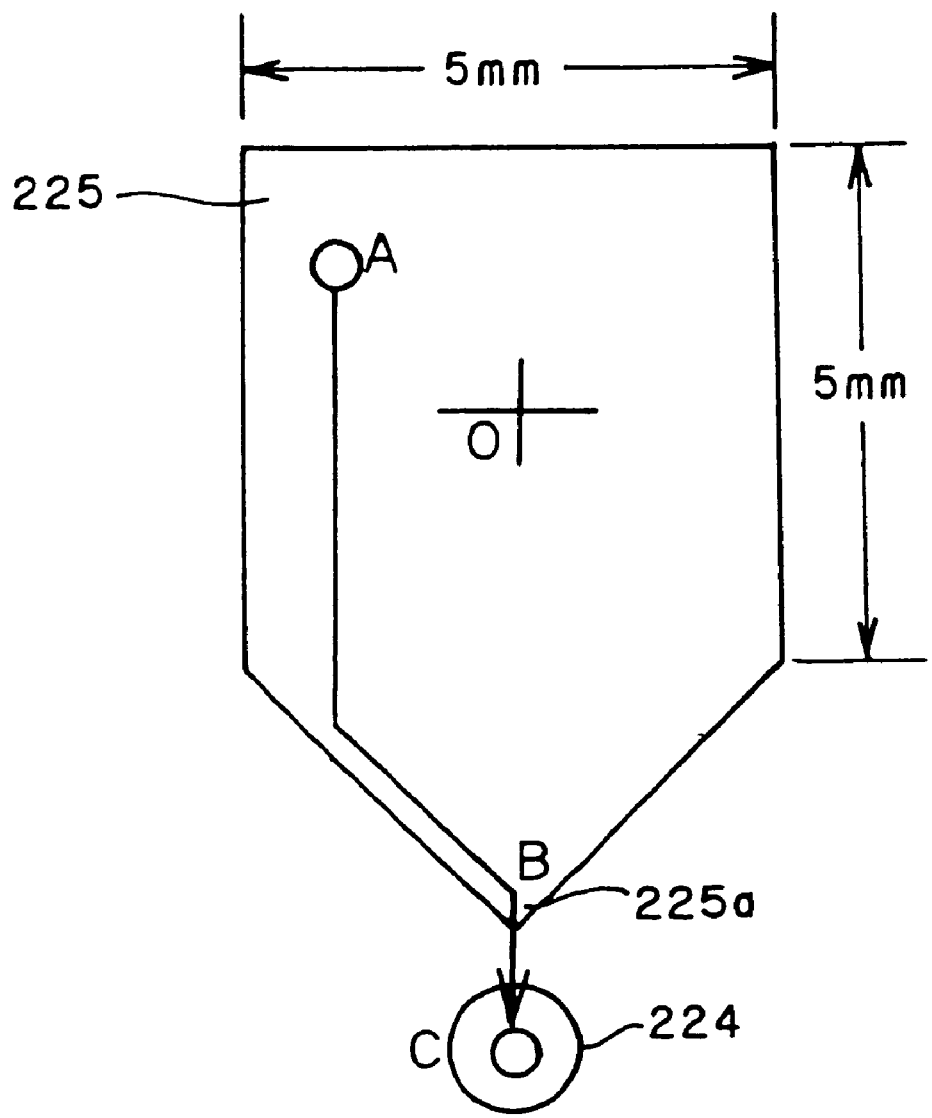
FIG. 17 is an illustration showing a land mark and an origin mark.
Figure 18:
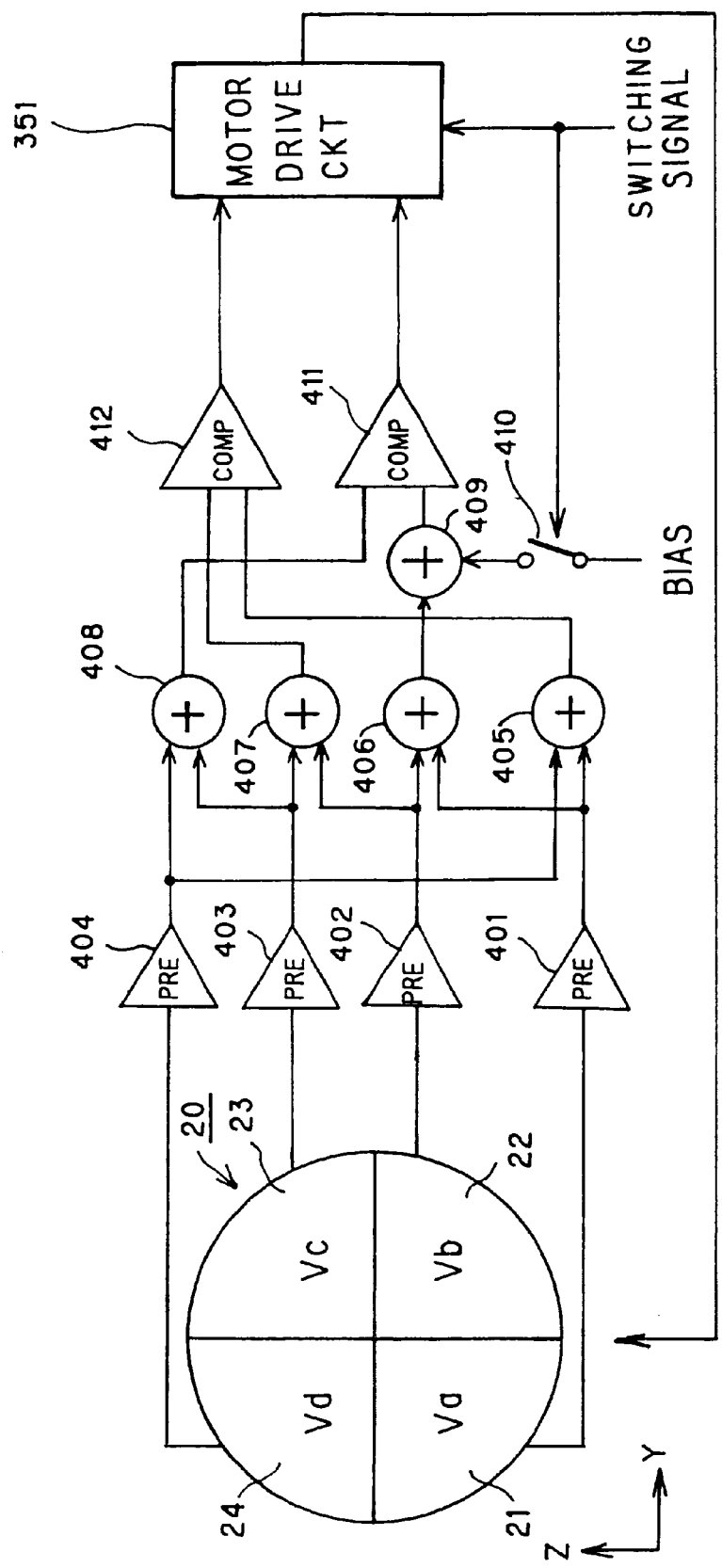
FIG. 18 is a circuit block diagram of a processing circuit for signals obtained in a 4-division sensor.

FIG. 17 is an illustration showing a land mark and an origin mark. FIG. 18 is a circuit block diagram of a processing circuit for signals obtained in a 4-division sensor. While it has been explained that in the pin insertion and pulling out robot 300 shown in FIG. 7, the signals obtained through the 4-division sensor of the sensor block 302 are converted into the digital data by the A/D converter 353 and then fed to the computer system 340 for the arithmetic operation, here, for the purpose of better understanding, there is shown a hardware of a signal processing circuit for processing signals generated from a 4-division sensor.

Here, first, there will be explained a signal processing circuit for a 4-division sensor, as shown in FIG. 18.

Signals, which are representative of quantities of received light obtained through four sensor areas 21, 22, 23 and 24 constituting a 4-division sensor 20, respectively, are supplied via amplifiers 401, 402, 403 and 404 to adder circuits 405, 406, 407 and 408, respectively. When quantities of received light obtained through the four sensor areas 21, 22, 23 and 24 constituting the 4-division sensor 20 are expressed by $V_a$, $V_b$, $V_c$ and $V_d$, respectively, the adder circuits 405, 406, 407 and 408 calculate light volumes $V_a+V_d$, $V_a+V_b$, $V_b+V_c$, and $V_c+V_d$, respectively. Of those 4 addition values, two addition values $V_a+V_b$ and $V_c+V_d$ obtained in the two adder circuits 406 and 408, respectively are applied to a comparator 411 to determine a light volume balance (upper and lower balance) in the event the four sensor areas 21, 22, 23 and 24 are divided into two sets of a pair of sensor areas 21 and 22 and a pair of sensor areas 23 and 24. Where the addition value $V_a+V_b$ is once applied to an adder circuit 409 so that a bias, which is applied via a switching element 410 to the adder circuit 409, is added to the addition value $V_a+V_b$, and then the sum is supplied to the comparator 411. The another addition value $V_c+V_d$ is supplied directly to the comparator 411. On the other hand, of the four addition values, two addition values $V_a+V_d$ and $V_b+V_c$ obtained in the two adder circuits 405 and 407, respectively are applied to a comparator 412 to determine a light volume balance (right and left balance) in the event the four sensor areas 21, 22, 23 and 24 are divided into two sets of a pair of sensor areas 21 and 24 and a pair of sensor areas 22 and 23. Outputs of the comparators 411 and 412 are supplied to a motor drive circuit 351 to drive the motors 304 and 307 shown in FIG. 7, and whereby the pin insertion and pulling out head 301 is translated.

A switching signal shown in FIG. 18 serves, when the upper and lower light volume balance or the right and left light volume balance is broken, to optionally select between a mode in which the 4-division sensor (the pin insertion and pulling out head) is translated in such a direction that a sensor area involved in the side less in light volume is selected as the top, and a mode in which the 4-division sensor (the pin insertion and pulling out head) is translated in such a direction that a sensor area involved in the side much in light volume is selected as the head. Usually, the motor drive circuit operates in such a manner that the 4-division sensor is translated in such a direction that a sensor area involved in the side less in light volume is selected as the head, and at that time, the switching element 410 is turned off so that no bias is applied to the adder circuit 409, whereby the addition value $V_a+V_b$, which is an output of the adder circuit 406, is supplied to the comparator 411. On the other hand, when the 4-division sensor 20 has been translated onto the land mark 225 shown in FIG. 17, the switching signal is switched over so that the motor drive circuit 351 translates the 4-division sensor in such a direction that a sensor area involved in the side much in light volume is selected as the head, and the switching element 410 is turned on so that a bias is applied to the adder circuit 409, whereby the addition value ($V_a+V_b$+the bias), which is indicative of a receipt of the more bright light, is supplied to the comparator 411. Accordingly, in this case, when the same amount of light is incident upon any of the four sensor areas 21, 22, 23 and 24 constituting the 4-division sensor 20, the 4-division sensor (the pin insertion and pulling out head) is translated downward in FIG. 18 while two sensor areas 21 and 22 are selected as the head.

Again referring to FIG. 17, there will be described a method of detecting an origin mark.

The pin insertion and pulling out head 301 (FIG. 7) is translated onto the land mark 225 as shown by the arrow a in FIG. 8. The land mark 225 is made of the same material as the wires 11 (FIG. 2) and the lands 13 of the crosspoint holes 12 (FIG. 2), and is simultaneously formed together the wires 11 (FIG. 2) and the lands 13 of the crosspoint holes 12. The land mark 225 has a wide area, for example, 5 mm×5 mm, as shown in FIG. 17, expanding on the center O in design, so that the pin insertion and pulling out head 301 may reach any place of the land mark 225 even if the pin insertion and pulling out head 301 includes errors in its movement. Here, it is assumed that the pin insertion and pulling out head 301 is translated onto a point A.

At that time, the switching signal shown in FIG. 18 switches over to a mode in which the motor drive circuit 351 translates the pin insertion and pulling out head in such a direction that of the four sensor areas 21, 22, 23 and 24 constituting the 4-division sensor 20, the sensor areas involved in receipt of more bright light are selected as the head, and also provides such a control that a bias is added to the addition value $V_a+V_b$ of the received signals $V_a$ and $V_b$ at the sensor areas 21 and 22 of the 4-division sensor 20 shown in FIG. 18.

Since the land mark 225 is of high light reflectance in its entirety and also uniform, the four sensor areas 21, 22, 23 and 24 constituting the 4-division sensor 20 receive the almost same amount of light. Thus, owing to the bias effect, the 4-division sensor 20 travels from the point A downward, and when it reaches the oblique boundary line of the under side of the land mark 225, it travels along the boundary line to the tip 225a (point B) of the land mark 225. The origin mark 224 is located in the vicinity of the tip 225a of the land mark 225. And a positional relation therebetween is known beforehand. Thus, the 4-division sensor 20 is translated to a point C (original mark 224) on the basis of data representative of the positional relation between the origin mark 224 and the tip 225a of the land mark 225. At that time, the switching signal is switched in the circuit shown in FIG. 18, as a result there is given a mode in which the motor drive circuit 351 translates the 4-division sensor 20 in such a direction that of the four sensor areas 21, 22, 23 and 24 constituting the 4-division sensor 20, the sensor areas involved in receipt of less light volume are selected as the head, and the bias is cut off. Then, when the 4-division sensor 20 is translated from the tip 225a to the origin mark 224, even in the event that the 4-division sensor 20 is not exactly translated to the position of the origin mark 224 owing to some error, it is possible to perform an automatic positional correction and to detect the exact position of the origin mark 224.

Hereinafter, there will be described the positional deviation correction (CT correction and 4-point correction).

Figure 19:
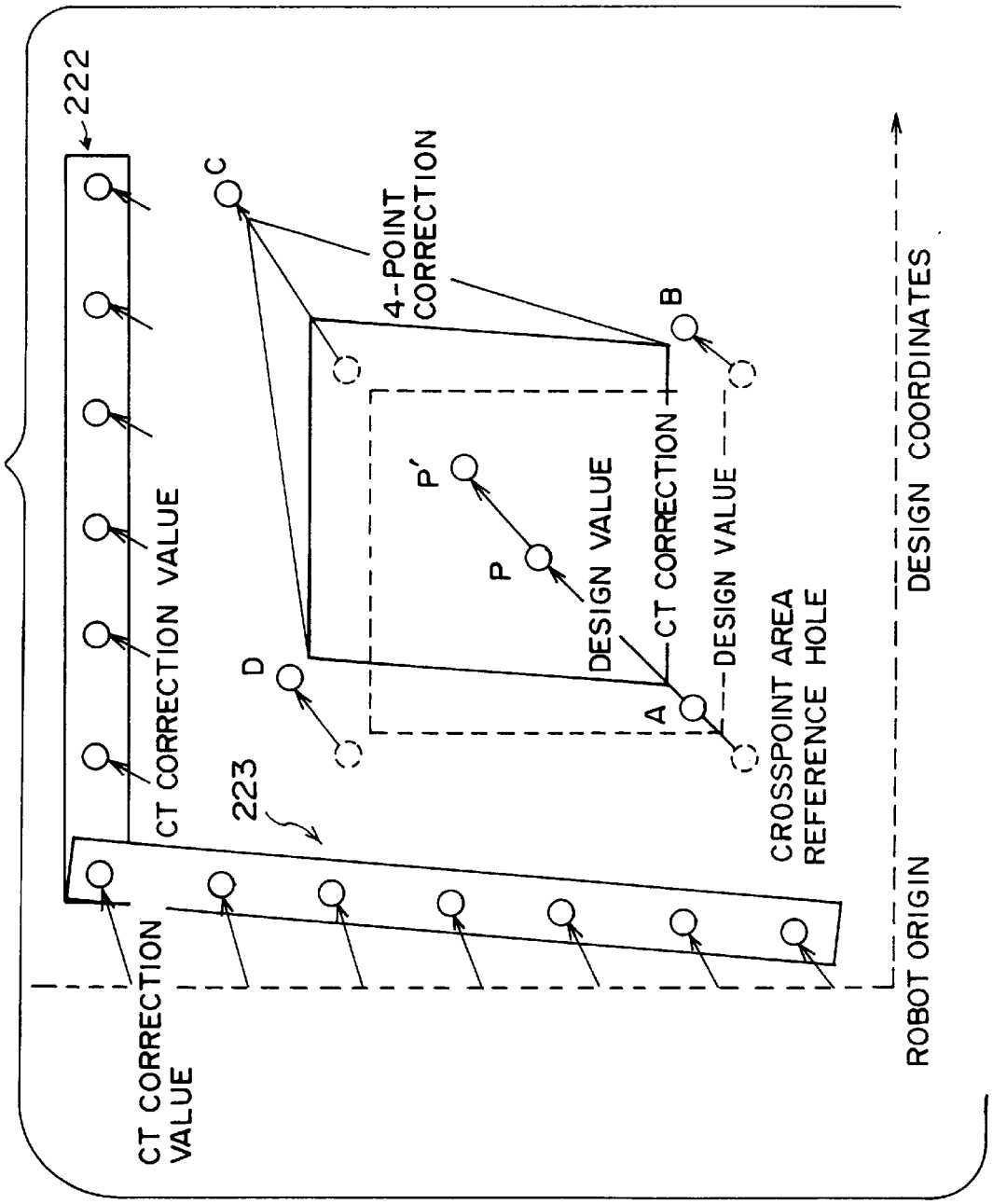
FIG. 19 is a conceptual view useful for understanding a CT correction and a 4-point correction.

FIG. 19 is a conceptual view useful for understanding a CT correction and a 4-point correction.

The CT correction is to correct the position detection marks arranged on the horizontal CT 222 and the vertical CT 223 in accordance with an amount of deviation (referred to as a "CT correction value") from a design value. The 4-point correction is to correct the position detection marks (A, B, C, D) arranged on four corners of an area consisting of an assembly of the crosspoint holes in accordance with an amount of deviation (referred to as a "reference hole offset value") from a design value. In FIG. 19, it may be understood as if all of main courses of errors to be subjected to the CT correction and the 4-point correction are associated with the MTB. Indeed, however, the main courses exist on both the MTB and the pin insertion and pulling out robot.

Hereinafter, the procedure for the correction will be explained.

First, as mentioned before, positions of the position detection marks are measured periodically or irregularly with the use of the rotation sensors 305 and 308 for detecting amounts of rotation of the motors 304 and 305 shown in FIG. 7, respectively.

Derivation of CT Correction Values

Positions of a plurality of position detection marks constituting a CT (calibration track) on each MTB are measured, and positional deviations of the position detection marks from the design value, which would be caused by swells of Y-axis and Z-axis, errors in feeding (FIGS. 13 and 14), errors in mounting of the MTB, etc., are evaluated to derive CT correction values.

Horizontal CT correction values:

When the design value of the i-th position detection mark on the horizontal CT and the measured value of the i-th position detection mark are expressed by (hCTiY,hCTiZ) and (rhCTiY,rhCTiZ), respectively, the correction value ($\Delta$ h C T Y, $\Delta$ h C T i Y) at Y=h C T i Y is determined by the following equation.

$$(\Delta\ h\ C\ T\ i\ Y, \Delta\ h\ C\ T\ i\ Y) = (r\ h\ C\ T\ i\ Y - h\ C\ T\ i\ Y, r\ h\ C\ T\ i\ Z - h\ C\ T\ i\ Z)$$

Vertical CT correction values:

When the design value of the i-th position detection mark on the vertical CT and the measured value of the i-th position detection mark are expressed by (vCTiY,vCTiZ) and (rvCTiY,rvCTiZ), respectively, the correction value ($\Delta$ v C T i Y, $\Delta$ v C T i Z) at z=v C T i Z is determined by the following equation.

$$(\Delta\ v\ C\ T\ i\ Y, \Delta\ v\ C\ T\ i\ Z) = (r\ v\ C\ T\ i\ Y - v\ C\ T\ i\ Y, r\ v\ C\ T\ i\ Z - v\ C\ T\ i\ Z)$$

Derivation of CT Offset Values

An amount of deviation between a design value and a measured value of a position detection mark other than the position detection marks constituting the horizontal CT and the vertical CT is referred to as a reference hole offset value, and typically, when the design value and the measured value of the position detection mark W are expressed by (WY WZ) and (rWY, rWZ), respectively, the reference hole offset value ($\Delta$WY, $\Delta$WZ) is determined by the following equation.

$$(\Delta WY, \Delta WZ) = (rWY - WY, rWZ - WZ)$$

Next, there will be explained the CT correction and the 4-point correction using the correction values determined in accordance with the above-mentioned schemes.

Here, the modification is applied for the design value in the named order of (1) the 4-point correction and (2) the CT correction.

Conversion of Reference Hole Offset Values

In the event that reference hole offset values of 4 points surrounding an area consisting of an assembly of crosspoint holes on a MTB are used to perform a 4-point correction, there exist components which would be involved in the overlapping correction with respect to the CT correction subsequent to the 4-point correction. Consequently, the 4-point correction is performed through the subtraction of the overlapping components. For the reasons mentioned above, a CT correction value is subtracted from a reference hole offset value.

Figure 20:
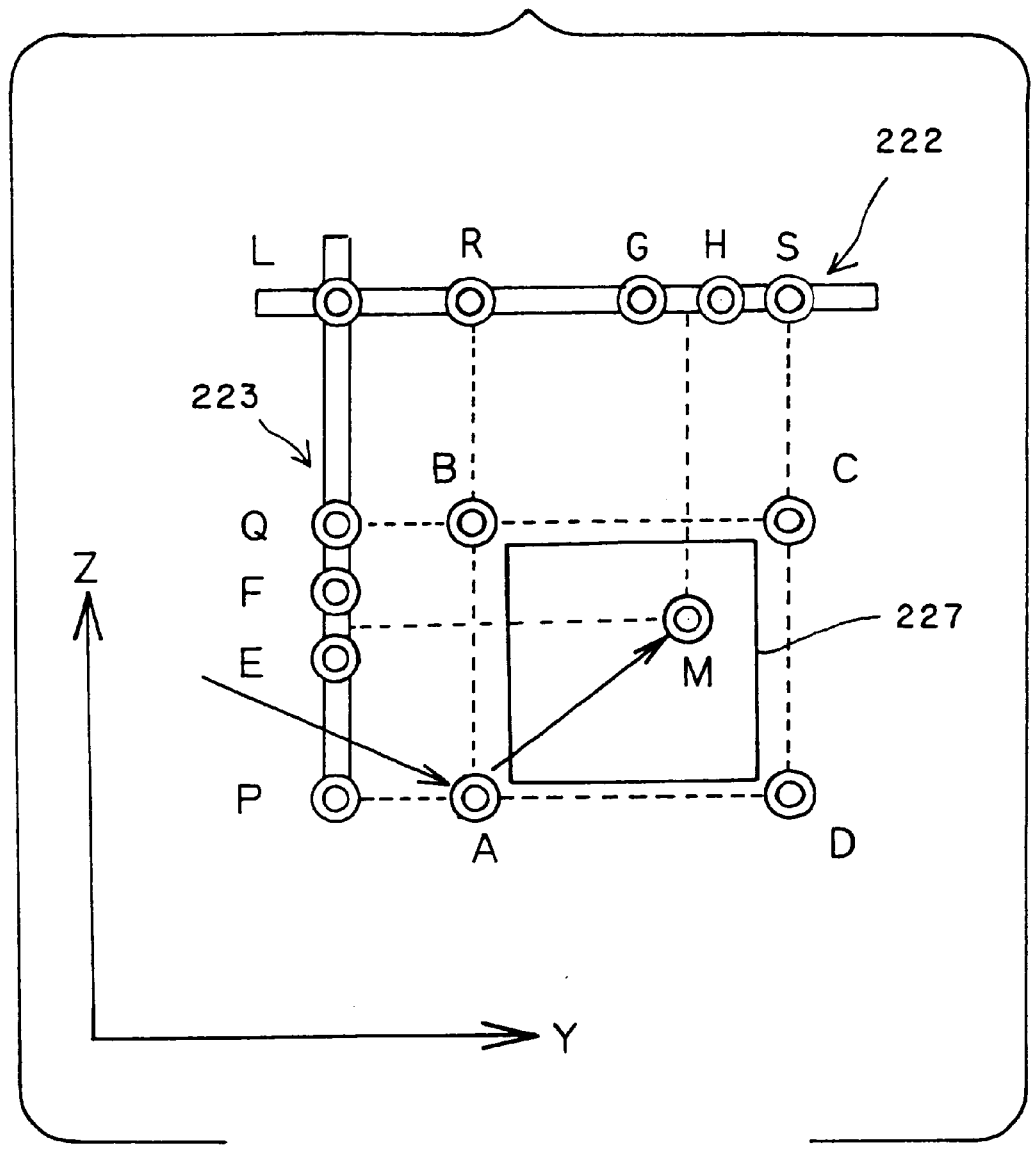
FIG. 20 is an illustration showing a mapping relation of position detection marks in conjunction with the CT correction and the 4-point correction.

FIG. 20 is an illustration showing a mapping relation of position detection marks in conjunction with the CT correction and the 4-point correction.

It is assumed that a connection pin (not illustrated) is intended to be inserted into a crosspoint hole M (point M) included in an area 227 shown in FIG. 20.

Position detection marks of four corners surrounding the area 227 are referred to as points A, B, C and D, as shown in the figure. And of position detection marks on the horizontal CT 222 and the vertical CT 223, the position detection marks as illustrated are referred to as points E, F, G, H, P, Q, R, R, S, L. A difference (a CT correction value or a reference hole offset value) between the design value of each of the position detection marks and the associated measured value is expressed by $\Delta$, and the direction of the deviation is expressed by Y and Z. For example, the reference hole offset value of the point A is expressed by ($\Delta$AY, $\Delta$AZ), and the CT correction value of the point E is expressed by($\Delta$EY, $\Delta$EZ).

Here, as the basic data for the 4-point correction, there are determined "reference hole offset correction values" each of which is obtained by means of subtracting the CT correction value from the reference hole offset value. The reference hole offset correction values are associated with the points A, B, C and D, respectively, and are expressed by (dAY, dAZ), (dBY, dBZ), (dCY, dCZ) and (dDY, dDZ), respectively.

$$dAY = \Delta AY - \Delta PY - \Delta RY + \Delta LY$$

$$dAZ = \Delta AZ - \Delta PZ - \Delta RZ + \Delta LZ$$

$$dBY = \Delta BY - \Delta QY - \Delta RY + \Delta LY$$

$$dBZ = \Delta BZ - \Delta QZ - \Delta RZ + \Delta LZ$$

$$dCY = \Delta CY - \Delta QY - \Delta SY + \Delta LY$$

$$dCZ = \Delta CZ - \Delta QZ - \Delta SZ + \Delta LZ$$

$$dDY = \Delta DY - \Delta PY - \Delta SY + \Delta LY$$

$$dDZ = \Delta DZ - \Delta PZ - \Delta SZ + \Delta LZ \qquad (1)$$

4-Point Correction

The reference hole offset correction values (dAY, dAZ), (dBY, dBZ), (dCY, dCZ) and (dDY, dDZ), which are determined through the equation (1), are used to perform the 4-point correction in the manner set forth below.

There is given a definition as shown in Table 1. Where units of distances are given by mm.

TABLE 1

| | |
|---|---|
| origin of area 227 | point A |
| design distance between points A and B | AB |
| design distance between points A and D | AD |
| Number as crosspoint hole of point M | my, mz |
| distance between point A (origin) and crosspoint hole (1,1) | $\Delta y, \Delta z$ |
| design position of point M | (MY, MZ) |
| position of point M after 4-point correction | (MY', MZ') |

Figure 1:
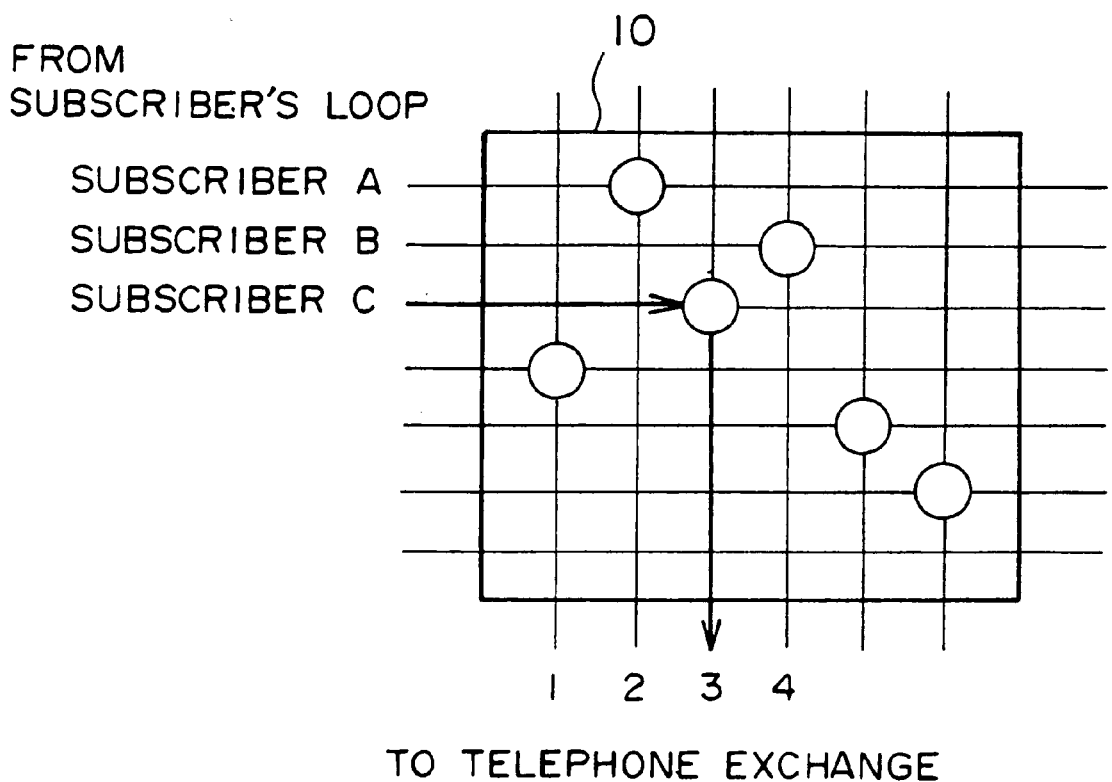
FIG. 1 is a diagram useful for understanding a functional effect of an automatic wiring connection apparatus.
Figure 2:
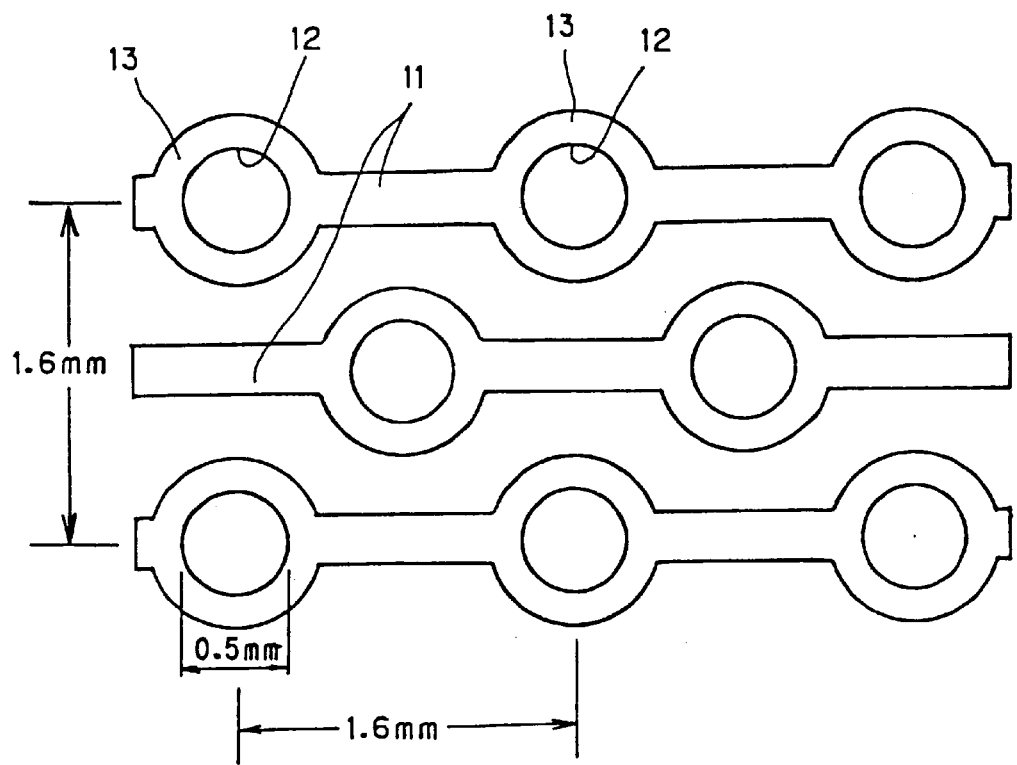
FIG. 2 is a typical illustration showing part of wirings and crosspoint holes on a matrix board.

The design values MY and MZ of the point M are expressed by $$MY = \Delta y + 1.6 \times mY$$

$$MY = \Delta z + 1.6 \times mz$$

Where the numerical value 1.6 is representative of an interval (1.6 mm) between the adjacent crosspoint holes (FIG. 2).

$MY' = dAY$ : (deviation component of reference hole ) +

$(AD + dDY - dAY) \times (MY / AD)$ : (expansion/contraction) +

$(dBY - dAY) \times (MZ / AB)$ : (slant component) +

$(dAY - dBY + dCY - dDY) \times$ $(MY / AD) \times (MZ / AB)$ : (trapezoid component)

-continued $MZ' = dAZ$ : (deviation component of reference hole) +

$(AB + dBZ - dAZ) \times (MZ/AB)$ : (expansion/contraction) +

$(dDZ - dAZ) \times (MY/AD)$ : (slant component) +

$(dAZ - dBZ + dCZ - dDZ) \times$ $(MY/AD) \times (MZ/AB)$ : (trapezoid component)

Figure 21:
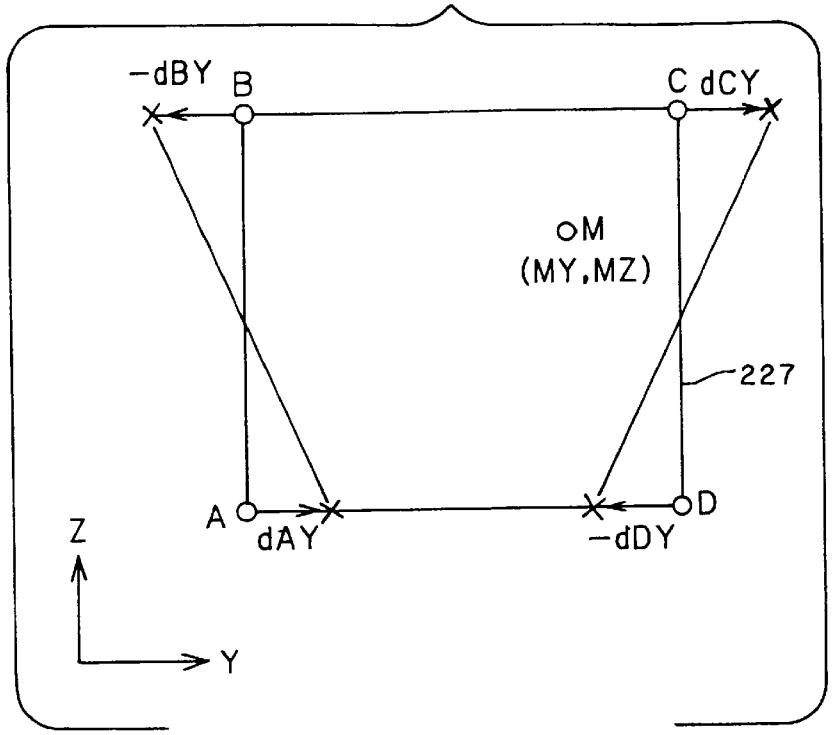
FIG. 21 is an explanatory view useful for understanding a trapezoid component.

FIG. 21 is an explanatory view useful for understanding the trapezoid component of MY'. This trapezoid component represents an extent that the trapezoidal modification of the area 227 shown in FIG. 21 has an effect on the positional deviation of the point M. In a similar fashion to that of the trapezoid component, the expansion and contraction component and the slant component can be interpreted.

CT Correction

The position data (MY' MZ')of the point M after the 4-point correction thus determined is further corrected with the use of CT correction values.

Numbers (points E and G in case of FIG. 20) of position detection sensors on the CT are determined, for the purpose of the use of a computation, in accordance with the following equation.

$nh = INT((MY' - hCT1Y)/9.6)$ $nv = INT((MZ' - vCT1Z)/9.6)$

Where 9.6 denotes a distance between the adjacent position detection marks on the CT, and INT (. . .) is a function which implies that decimals are omitted.

Next, the correction value of the point M is determined through the proportional allotment as follows.

Figure 22:
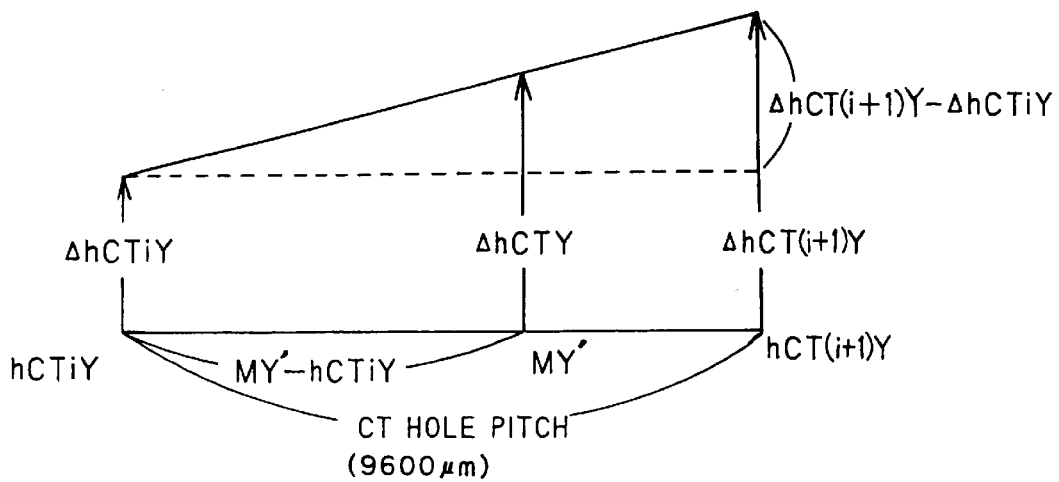
FIG. 22 is an explanatory view useful for understanding an arithmetic method of determining correction values.

$\Delta hCTY = \Delta hCTiY + (MY' - hCTiY)/9.6 \times$
$(\Delta hCT(i+1)Y - \Delta hCTiY)$ $\Delta hCTZ = \Delta hCTiZ + (MY' - hCTiY)/9.6 \times$
$(\Delta hCT(i+1)Z - \Delta hCTiZ)$ $\Delta vCTY = \Delta vCTiY + (MZ' - vCTiZ)/9.6 \times$
$(\Delta vCT(i+1)Y - \Delta vCTiY)$ $\Delta vCTZ = \Delta vCTiZ + (MZ' - vCTiZ)/9.6 \times$
$(\Delta vCT(i+1)Z - \Delta vCTiZ)$ FIG. 22 is an explanatory view useful for understanding an arithmetic method as to Δh C T Y of the above four equations.

Next, the translation position data (MY", MZ") after final correction of the point M, which indicates that when the pin insertion and pulling out head is translated to the coordinate point represented by the translation position data, the crosspoint hole of the point M exists at the place, is determined.

$MY'' = MY' + \Delta hCTY + \Delta vCTY - \Delta LY + \Delta hY$ $MZ'' = MZ' + \Delta hCTZ + \Delta vCTZ - \Delta LZ + \Delta hz$ Where (ΔLY, ΔLZ) denotes the CT correction value for the position detection mark L located at the intersection of the horizontal CT 222 and the vertical CT 223, shown in FIG. 20, and (ΔhY, Δhz) denotes executive offset value between the sensor block 302 and the pin insertion and pulling out head 301 shown in FIG. 7.

In the event that a connection pin is inserted into the crosspoint hole of the point M shown in FIG. 20, the point A is selected as the origin point, and the pin insertion and pulling out head 301 shown in FIG. 7 is translated to the position indicated by the translation position data (MY", MZ"), so that the pin insertion and pulling out head 301 can be translated to the position of the crosspoint hole with great accuracy.

Table 2 shows the concrete data, where A, B, . . . denote the same reference symbols as those in FIG. 20.

TABLE 2

| ref. | design coordinates | measured values | CT correction values | ref. hole offset values | ref. hole offset correction values |
|---|---|---|---|---|---|
| point A | 30, 30 | 35, 33 | — | 5, 3 | −1, 0 |
| point B | 30, 100 | 43, 110 | — | 13, 10 | 0, 0 |
| point C | 100, 100 | 120, 110 | — | 10, 10 | 0, 0 |
| point D | 100, 30 | 116, 33 | — | 16, 3 | 3, 0 |
| point P | 0, 30 | 3, 33 | 3, 3 | — | — |
| point E | 0, 65 | 6.5, 71.5 | 6.5, 6.5 | — | — |
| point F | 0, 74.6 | 7.5, 82.1 | 7.5, 7.5 | — | — |
| point Q | 0, 100 | 10, 110 | 10, 10 | — | — |
| point L | 0, 150 | 15, 165 | 15, 15 | — | — |
| point R | 30, 150 | 48, 165 | 18, 15 | — | — |
| point C | 65, 150 | 86.5, 165 | 21.5, 15 | — | — |
| point H | 74.6, 150 | 97.1, 165 | 22.5, 15 | — | — |
| point S | 100, 150 | 125, 165 | 25, 15 | — | — |
| point M | 40, 40 | — | — | — | — | point M: relative coordinates from ref. point A.
other points: ROBOT coordinates (e.q. origin 224 in FIG. 8 is given as reference.)

First, the pin insertion and pulling out head is translated to a position of a measured value (35, 33) of the reference point A, referring to the measured value (35, 33), and then the detection of the origin point A by the 4-division sensor is initiated so that the pin insertion and pulling out head is properly disposed at the origin point A.

The design value (MY, MZ) of the crosspoint hole (point M), into which the connection pin is intended to be inserted, is expressed by (MY, MZ)=(40, 40)

This is first modified by the 4-point correction.

$MY' = dAY +$ $(AD + dDY - dAY) \times (MY/AD) +$ $(dBY - dAY) \times (MZ/AB) +$ $(dAY - dBY + dCY - dDY) \times (MY/AD) \times (MZ/AB)$ $= -1 + (70 + 3 + 1) \times 40/70 + 1 \times 40/70 +$ $(-1 - 3) \times 40 \times 40/70/70$ $= -1 + 42.28 + 0.57 - 1.31$ $= 40.54$ $MZ' = dAZ +$ $(AB + dBZ - dAZ) \times (MZ/AD) +$ $(dDZ - dAZ) \times (MY/AD) +$ $(dAZ - dBZ + dCZ - dDZ) \times (MY/AD) \times (MZ/AB)$ $= 40.0$ Then, the modified value (MY', MZ') thus obtained through the 4-point correction is further modified by the CT correction.

$$\Delta hMY = \Delta hGY + (MY' - GY)/CT \text{ hole pitch} \times (\Delta hHY - \Delta hGY)$$
$$= 21.5 + (40.54 - 35)/9.6 \times (22.5 - 21.5)$$
$$= 22.08$$

$$\Delta hMZ = \Delta hGZ + (MY' - hGY)/CT \text{ hole pitch} \times (\Delta hHZ - \Delta hGZ)$$
$$= 15$$

$$\Delta vMY = \Delta vEY + (MZ' - vEZ)/CT \text{ hole pitch} \times (\Delta vFY - \Delta vEY)$$
$$= 6.5 + (40 - 35)/9.6 \times (7.5 - 6.5)$$
$$= 7.02$$

$$\Delta vMZ = \Delta vEZ + (MZ' - vEZ)/CT \text{ hole pitch} \times (\Delta vFZ - \Delta vEZ)$$
$$= 6.5 + (40 - 35)/9.6 \times (7.5 - 6.5)$$
$$= 7.02$$

Determine the re-corrected value (MY", MZ") of the point M.

$$MY'' = MY' + \Delta hMY + \Delta vMY - \Delta LY$$
$$= 40.54 + 22.08 + 7.02 - 15 = 54.64$$
$$MZ'' = MZ' + \Delta hMZ + \Delta vMZ - \Delta LZ$$
$$= 40 + 15 + 7.02 - 15 = 47.02$$

Subtract the correction value (5, 3) of the reference point A to determine the relative movement.

The relative movement (54.64, 47.02)−(5, 3)=(49.64, 44.02)

The pin insertion and pulling out head, which is located at the position of the reference point A, is translated by the relative movement to insert the connection pin into the crosspoint hole concerned.

According to the present embodiment, the 4-point correction is first carried out. It is acceptable, however, that the CT correction is first carried out. In the event that a main cause of errors to be corrected is somewhat different between the 4-point correction and the CT correction, and thus it is sufficient that only correction for the errors is conducted, only anyone of the 4-point correction and the CT correction is conducted.

As mentioned above, according to the present invention, it is possible to implement an automatic wiring connection apparatus capable of doing over again a correction as required after an installation, and also having less bad effect on an integration degree of crosspoint holes on a matrix board, and performing a positioning with great accuracy to reliably perform insertion and pulling out of connection pins.

While the present invention has been described with reference to the particular illustrative embodiments, it is not limited to such embodiments but only by the appended claims. It is to be appreciated that person skilled in the art can change or modify the embodiments without departing from the scope and spirit of the present invention.

We claim:

1. An automatic wiring connection apparatus comprising:
a matrix board, in which a plurality of crosspoint holes are arranged on a two-dimensional basis in a predetermined arrangement pitch, for forming signal paths according to insertion and pulling out of connection pins with respect to the plurality of crosspoint holes;
a pin insertion and pulling out head having charge of insertion and pulling out of connection pins with respect to the plurality of crosspoint holes of said matrix board; and
a pin insertion and pulling out robot having a head translation mechanism for translating said pin insertion and pulling out head on a two-dimensional basis along a surface of said matrix board;
wherein said matrix board has a calibration track in which a plurality of position detection marks are arranged in each of two directions mutually intersecting, and
said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for the position detection marks, and additional position data representative of a translation position of said pin insertion and pulling out head by said head translation mechanism when the position detection marks are detected by said sensor.

2. An automatic wiring connection apparatus according to claim 1, wherein said matrix board has said calibration track on each of the two directions.

3. An automatic wiring connection apparatus according to claim 1, wherein each of said plurality of position detection marks consists of a hole provided on a center, and a land surrounding the hole.

4. An automatic wiring connection apparatus according to claim 1, wherein said sensor is a 4-division sensor.

5. An automatic wiring connection apparatus comprising:
a matrix board, in which a plurality of crosspoint holes are arranged on a two-dimensional basis in a predetermined arrangement pitch, for forming signal paths according to insertion and pulling out of connection pins with respect to the plurality of crosspoint holes;
a pin insertion and pulling out head having charge of insertion and pulling out of connection pins with respect to the plurality of crosspoint holes of said matrix board; and
a pin insertion and pulling out robot having a head translation mechanism for translating said pin insertion and pulling out head on a two-dimensional basis along a surface of said matrix board;
wherein said matrix board has a plurality of areas mutually separated with breaks in an arrangement of the crosspoint holes, and has a plurality of position detection marks which are arranged at positions surrounding with at least 4 points on each of the plurality of areas, and
said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for position detection marks not less than 4 points surrounding an area including the desired crosspoint hole on said matrix board, and additional position data representative of a translation position of said pin insertion and pulling out head by said head translation mechanism when the position detection marks not less than 4 points are detected by said sensor.

6. An automatic wiring connection apparatus according to claim 5, wherein each of said plurality of position detection marks consists of a hole provided on a center, and a land surrounding the hole.

7. An automatic wiring connection apparatus according to claim 5, wherein said sensor is a 4-division sensor.

8. An automatic wiring connection apparatus comprising:
a matrix board, in which a plurality of crosspoint holes are arranged on a two-dimensional basis in a predetermined arrangement pitch, for forming signal paths according to insertion and pulling out of connection pins with respect to the plurality of crosspoint holes;
a pin insertion and pulling out head having charge of insertion and pulling out of connection pins with respect to the plurality of crosspoint holes of said matrix board; and
a pin insertion and pulling out robot having a head translation mechanism for translating said pin insertion and pulling out head on a two-dimensional basis along a surface of said matrix board;
wherein said matrix board has a plurality of areas mutually separated with breaks in an arrangement of the crosspoint holes,
said matrix board has a calibration track in which a plurality of position detection marks are arranged in each of two directions mutually intersecting, and has a plurality of position detection marks which are arranged at positions surrounding with at least 4 points on each of the plurality of areas, and
said pin insertion and pulling out robot has a sensor adapted for moving in united body together with said pin insertion and pulling out head to detect the position detection marks, and a position arithmetic unit for determining position data for translating said pin insertion and pulling out head to a desired crosspoint hole in accordance with position data on design for the position detection marks, and additional position data representative of a translation position of said pin insertion and pulling out head by said head translation mechanism when the position detection marks are detected by said sensor, and in addition in accordance with position data on design for position detection marks not less than 4 points surrounding an area including the desired crosspoint hole on said matrix board, and additional position data representative of a translation position of said pin insertion and pulling out head by said head translation mechanism when the position detection marks not less than 4 points are detected by said sensor.

9. An automatic wiring connection apparatus according to claim 8, wherein a part of the plurality of position detection marks constituting said calibration track of said matrix board serves as a part of the plurality of position detection marks arranged at positions surrounding with at least 4 points on each of the plurality of areas.

10. An automatic wiring connection apparatus according to claim 8, wherein said matrix board has said calibration track on each of the two directions.

11. An automatic wiring connection apparatus according to claim 8, wherein each of said plurality of position detection marks consists of a hole provided on a center, and a land surrounding the hole.

12. An automatic wiring connection apparatus according to claim 8, wherein said sensor is a 4-division sensor.

13. An automatic wiring connection apparatus comprising:
a matrix board, in which a plurality of crosspoint holes are arranged on a two-dimensional basis in a predetermined arrangement pitch, for forming signal paths according to insertion and pulling out of connection pins with respect to the plurality of crosspoint holes;
a pin insertion and pulling out head having charge of insertion and pulling out of connection pins with respect to the plurality of crosspoint holes of said matrix board; and
a pin insertion and pulling out robot having a head translation mechanism for translating said pin insertion and pulling out head on a two-dimensional basis along a surface of said matrix board;
wherein said matrix board has a predetermined position detection mark and a land mark having an area larger than the position detection mark and also having a wedge-like configuration of tip portion, a relative position of the tip portion of the land mark being known with respect to the position detection mark,
said pin insertion and pulling out robot has a sensor adapted for moving in united body together with said pin insertion and pulling out head to detect the position detection mark, and a head translation control unit for controlling said head translation mechanism in such a manner that said sensor is disposed on the land mark, said sensor disposed on the land mark is moved to the tip portion, and the sensor translated to the tip portion is moved to the position detection mark.

14. An automatic wiring connection apparatus comprising:
a matrix board having crosspoint holes each perforated on a land, said matrix board having position detection holes each having a land larger than the crosspoint holes; and
a sensor for detecting the position detection hole,
wherein positions of the crosspoint holes are determined in accordance with a position of the position detection hole detected by said sensor.

15. An automatic wiring connection apparatus according to claim 14, wherein a plurality of said position detection holes are arranged in two directions mutually intersecting to form a calibration track,
said apparatus has a head translation mechanism for moving said sensor,
positions of the position detection holes of said calibration track are detected by said sensor while being moved, and
said apparatus has a position arithmetic unit for determining position data for positioning to crosspoint holes by said head translation mechanism in accordance with the detected position.

16. An automatic wiring connection apparatus according to claim 15, wherein said position arithmetic unit corrects mechanical errors of said head translation mechanism.

17. An automatic wiring connection apparatus according to claim 14, wherein said crosspoint holes are arranged in form of a square to define a crosspoint area,
said position detection holes are formed at positions surrounding the crosspoint area,
said apparatus has a head translation mechanism for moving said sensor,
positions of the position detection holes are detected by said sensor while being moved, and
said apparatus has a position arithmetic unit for determining position data for positioning to crosspoint holes by said head translation mechanism in accordance with the detected position.

18. An automatic wiring connection apparatus according to claim 17, wherein said position arithmetic unit corrects a slant of said head translation mechanism with respect to the crosspoint area.

* * * * *